United States Patent
Oteri et al.

(10) Patent No.: US 12,063,182 B2
(45) Date of Patent: Aug. 13, 2024

(54) RECEPTION AND TRANSMISSION IN NEW RADIO (NR) BASED ON SUBCARRIER SPACING

(71) Applicant: Apple Inc., Cupertino, CA (US)

(72) Inventors: Oghenekome Oteri, San Diego, CA (US); Yushu Zhang, Beijing (CN); Dawei Zhang, Saratoga, CA (US); Wei Zeng, Saratoga, CA (US); Chunhai Yao, Beijing (CN); Chunxuan Ye, San Diego, CA (US); Weidong Yang, San Diego, CA (US); Sigen Ye, Whitehouse Station, NJ (US); Haitong Sun, Cupertino, CA (US); Hong He, San Jose, CA (US); Seyed Ali Akbar Fakoorian, San Diego, CA (US); Huaning Niu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 403 days.

(21) Appl. No.: 17/439,138

(22) PCT Filed: Oct. 8, 2020

(86) PCT No.: PCT/CN2020/119867
§ 371 (c)(1),
(2) Date: Sep. 14, 2021

(87) PCT Pub. No.: WO2022/073163
PCT Pub. Date: Apr. 14, 2022

(65) Prior Publication Data
US 2022/0321315 A1    Oct. 6, 2022

(51) Int. Cl.
*H04L 5/00* (2006.01)
*H04L 1/1812* (2023.01)
(Continued)

(52) U.S. Cl.
CPC .......... *H04L 5/0098* (2013.01); *H04L 1/1812* (2013.01); *H04W 72/0446* (2013.01); *H04W 72/0453* (2013.01); *H04W 72/21* (2023.01)

(58) Field of Classification Search
CPC ... H04L 5/0098; H04L 1/1812; H04L 5/0044; H04L 5/0055; H04L 5/0007;
(Continued)

(56) References Cited

U.S. PATENT DOCUMENTS

| | | |
|---|---|---|
| 10,567,143 B2 | 2/2020 | Son |
| 2019/0260515 A1 | 8/2019 | Tang et al. |

(Continued)

FOREIGN PATENT DOCUMENTS

| | | |
|---|---|---|
| CN | 110830151 | 2/2020 |
| CN | 111525986 | 8/2020 |

(Continued)

OTHER PUBLICATIONS

International Patent Application No. PCT/CN2020/119867, International Search Report and Written Opinion, Mailed on Jun. 25, 2021, 8 pages.

(Continued)

*Primary Examiner* — Kibrom T Hailu
(74) *Attorney, Agent, or Firm* — Kilpatrick Townsend & Stockton LLP

(57) ABSTRACT

The present application relates to devices and components including apparatus, systems, and methods to provide reception and transmission in 5G NR at a frequency larger than 52.6 GHz and with a subcarrier spacing larger than 120 KHz.

20 Claims, 18 Drawing Sheets

(51) Int. Cl.
*H04W 72/0446* (2023.01)
*H04W 72/0453* (2023.01)
*H04W 72/21* (2023.01)

(58) Field of Classification Search
CPC ... H04L 1/1854; H04L 1/1864; H04L 5/0094; H04L 27/2602; H04L 27/26025; H04W 72/0446; H04W 72/0453; H04W 72/21
See application file for complete search history.

(56) References Cited

U.S. PATENT DOCUMENTS

| | | | |
|---|---|---|---|
| 2019/0306923 A1 | 10/2019 | Xiong et al. | |
| 2020/0213958 A1* | 7/2020 | Goyal | H04L 5/0055 |
| 2020/0252978 A1 | 8/2020 | Yi et al. | |
| 2020/0260415 A1 | 8/2020 | Li et al. | |
| 2020/0313809 A1 | 10/2020 | Park et al. | |
| 2020/0328849 A1 | 10/2020 | Noh et al. | |
| 2020/0329443 A1* | 10/2020 | Goyal | H04L 5/0055 |
| 2020/0358562 A1 | 11/2020 | Peng | |
| 2021/0099985 A1* | 4/2021 | Ang | H04W 72/23 |
| 2021/0168821 A1 | 6/2021 | Chen et al. | |
| 2021/0344453 A1 | 11/2021 | Lei et al. | |
| 2022/0150883 A1* | 5/2022 | Yang | H04L 5/0098 |
| 2022/0248395 A1 | 8/2022 | Andersson et al. | |
| 2022/0279538 A1 | 9/2022 | Jung et al. | |
| 2022/0361199 A1 | 11/2022 | Yin et al. | |
| 2023/0076328 A1* | 3/2023 | Harada | H04L 1/1614 |

FOREIGN PATENT DOCUMENTS

| | | |
|---|---|---|
| CN | 111585727 | 8/2020 |
| EP | 3669598 A1 | 6/2020 |
| EP | 3720029 | 10/2020 |
| JP | 2021511744 A | 5/2021 |
| WO | 2019144932 A1 | 8/2019 |
| WO | 2019215794 | 11/2019 |
| WO | 2019221475 | 11/2019 |
| WO | 2020133184 A1 | 7/2020 |

OTHER PUBLICATIONS

3rd Generation Partnership Project; Technical Specification Group Radio Access Network; NR; Physical channels and modulation (Release 16), 3GPP TS 38.211 V16.3.0, Sep. 2020, 133 pages.
3rd Generation Partnership Project; Technical Specification Group Radio Access Network; NR; Multiplexing and channel coding (Release 16), 3GPP TS 38.212 V16.3.0, Sep. 2020, 152 pages.
3rd Generation Partnership Project; Technical Specification Group Radio Access Network; NR; Physical layer procedures for control (Release 16), 3GPP TS 38.213 V16.2.0, Jun. 2020, 176 pages.
3rd Generation Partnership Project; Technical Specification Group Radio Access Network; NR; Physical layer procedures for control (Release 16), 3GPP TS 38.213 V16.3.0, Sep. 2020, 179 pages.
3rd Generation Partnership Project; Technical Specification Group Radio Access Network; NR; Physical layer procedures for data (Release 16), 3GPP TS 38.214 V16.3.0, Sep. 2020, 167 pages.
The International Application No. PCT/CN2020/119867, "International Preliminary Report on Patentability," Apr. 20, 2023, 5 pages.
The International Application No. PCT/US2021/050272, "International Preliminary Report on Patentability," Apr. 20, 2023, 8 pages.
International Patent Application No. PCT/US2021/050272, International Search Report and Written Opinion, Mailed on Dec. 21, 2021, 10 pages.
The U.S. Appl. No. 17/593,339, "Non-Final Office Action", mailed Nov. 21, 2023, 18 pages.
The European Application No. EP20956478.0, "Extended European Search Report", mailed Oct. 2, 2023, 9 pages.
The Japanese Application No. JP2023521405, "Office Action", mailed Feb. 13, 2024, 3 pages.
The U.S. Appl. No. 17/593,339, "Final Office Action," mailed May 2, 2024, 17 pages.
The Indian Patent Application No. IN202317025812, "First Examination Report," mailed Mar. 12, 2024, 7 pages.
The Indian Patent Application No. IN202317025813, "First Examination Report," mailed Mar. 12, 2024, 3 pages.
The Japanese Application No. JP2023-521405, "Notice of Decision to Grant" May 24, 2024, 3 pages.

* cited by examiner

1000

```
┌─────────────────────────────────────────────────────────────────────┐
│ Receiving, from a base station, downlink control information (DCI)  │
│ indicating a base station-signaled slot offset 1002                 │
└─────────────────────────────────────────────────────────────────────┘
                                   │
                                   ▼
┌─────────────────────────────────────────────────────────────────────┐
│ Determining a minimum slot offset that is based on a subcarrier      │
│ spacing of a physical downlink channel being larger than 120 KHz 1004│
└─────────────────────────────────────────────────────────────────────┘
                                   │
                                   ▼
┌─────────────────────────────────────────────────────────────────────┐
│ Determining, based on the minimum slot offset and the base station- │
│ signaled slot offset, a slot offset (K1) between data reception on   │
│ the physical downlink channel and hybrid automatic repeat request   │
│ (HARQ) transmission on a physical uplink channel 1006               │
└─────────────────────────────────────────────────────────────────────┘
                                   │
                                   ▼
┌─────────────────────────────────────────────────────────────────────┐
│ Transmitting, on the physical uplink channel and based on the slot   │
│ offset (K1), HARQ feedback for the data reception 1008              │
└─────────────────────────────────────────────────────────────────────┘
```

Figure 10

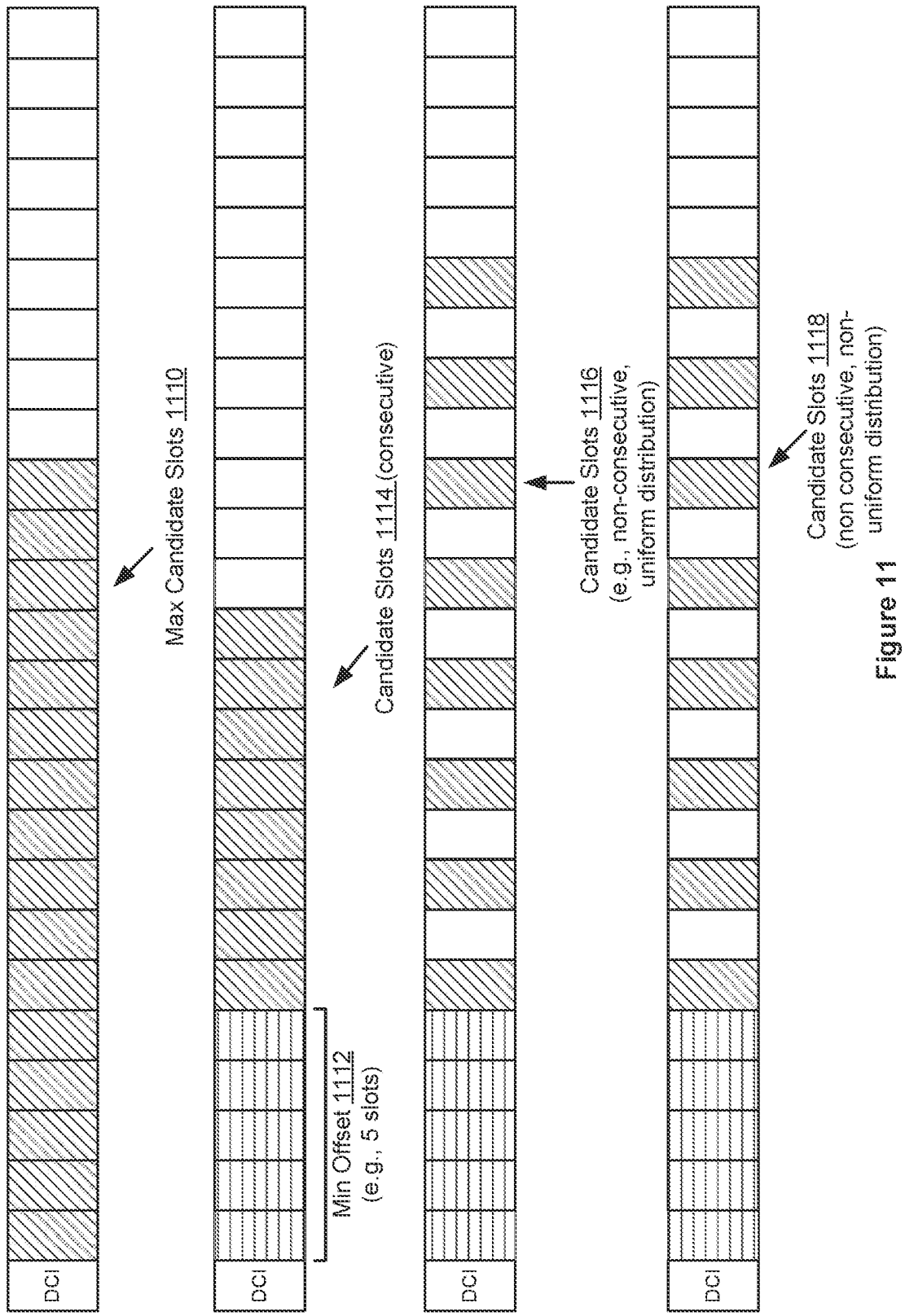

RECEPTION AND TRANSMISSION IN NEW RADIO (NR) BASED ON SUBCARRIER SPACING

CROSS-REFERENCES TO RELATED APPLICATIONS

This application is a U.S. National Stage Application of PCT/CN2020/119867, filed Oct. 8, 2020. The disclosure of which is herein incorporated by reference in its entirety for all purposes.

Fifth generation mobile network (5G) is a wireless standard that aims to improve upon data transmission speed, reliability, availability, and more. This standard, while still developing, includes numerous details relating to various aspects of wireless communication, for example, new radio (NR) and NR in a spectrum larger than 52.6 GHz.

BRIEF DESCRIPTION OF THE DRAWINGS

FIG. 10 illustrates an example of an operational flow/ algorithmic structure for HARQ slot-based scheduling that involves a minimum slot offset in accordance with some embodiments.

FIG. 11 illustrates examples of a slot-based scheduling for data reception or data transmission in accordance with some embodiments.

DETAILED DESCRIPTION

Figure 1:
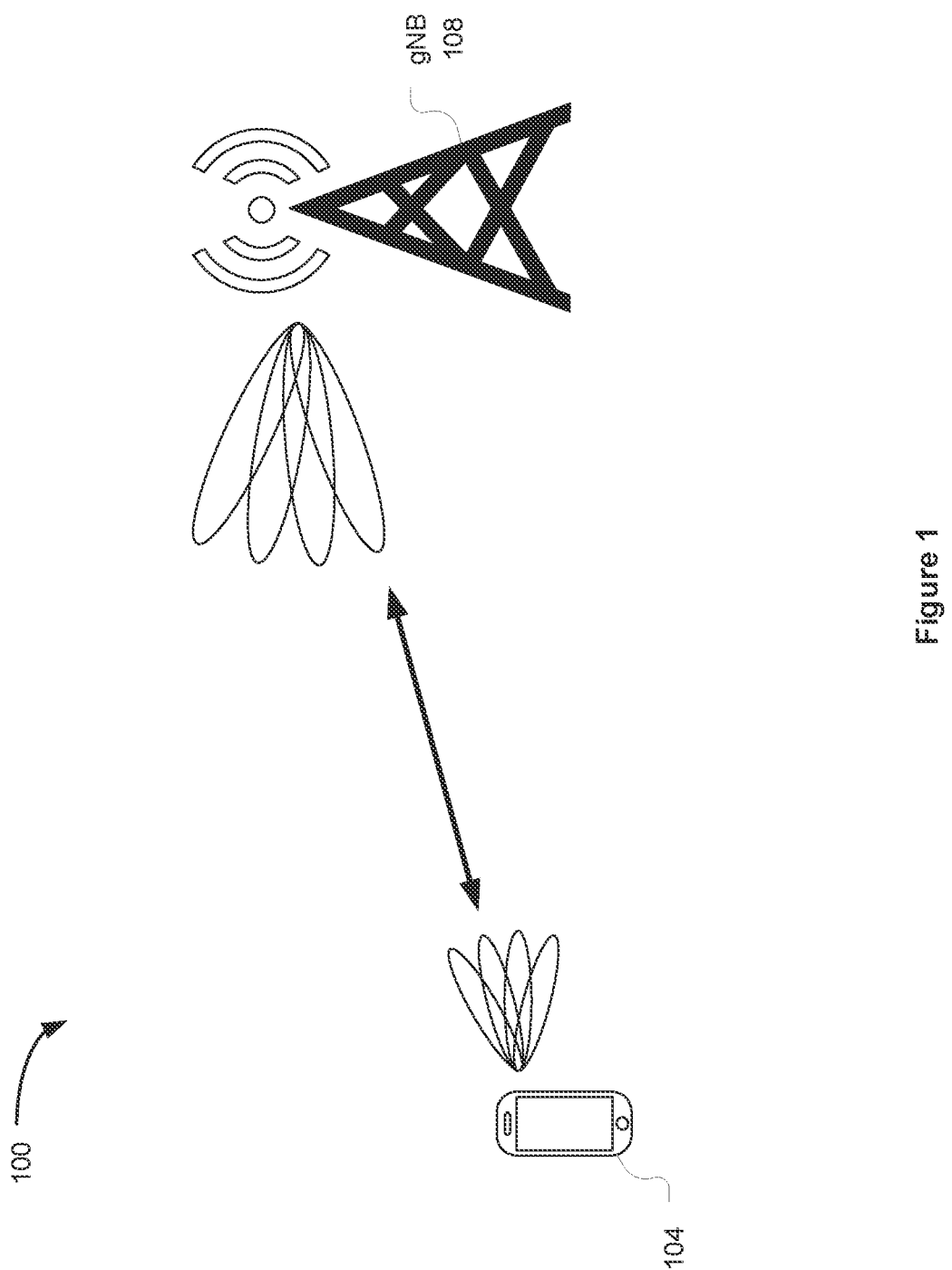
FIG. 1 illustrates an example of a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities, that is a network element of a communications network, and that may be configured as an access node in the communications network. A UE's access to the communications network may be managed at least in part by the base station, whereby the UE connects with the base station to access the communications network. Depending on the radio access technology (RAT), the base station can be referred as a gNodeB (gNB), eNodeB (eNB), access point, etc.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications such as those that define Fifth Generation (5G) NR system standards.

The gNB 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH); a physical downlink control channel (PDCCH); and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure and for beam selection.

The PDSCH may be used to transfer end-user application data, signaling radio bearer (SRB) messages, system information messages (other than, for example, MIB), and paging messages.

The PDCCH may transfer downlink control information (DCI) that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel state information-reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

Transmissions that use different antenna ports may experience different radio channels. However, in some situations, different antenna ports may share common radio channel characteristics. For example, different antenna ports may have similar Doppler shifts, Doppler spreads, average delay, delay spread, or spatial receive parameters (for example, properties associated with a downlink received signal angle of arrival at a UE). Antenna ports that share one or more of these large-scale radio channel characteristics may be said to be quasi co-located (QCL) with one another. 3GPP has specified four types of QCL to indicate which particular channel characteristics are shared. In QCL Type A, antenna ports share Doppler shift, Doppler spread, average delay, and delay spread. In QCL Type B, antenna ports share Doppler shift and Doppler spread are shared. In QCL Type C, antenna ports share Doppler shift and average delay. In QCL Type D, antenna ports share spatial receiver parameters.

The gNB 108 may provide transmission configuration indicator (TCI) state information to the UE 104 to indicate QCL relationships between antenna ports used for reference signals (for example, synchronization signal/PBCH or CSI-RS) and downlink data or control signaling, for example, PDSCH or PDCCH. The gNB 108 may use a combination of RRC signaling, MAC control element signaling, and DCI, to inform the UE 104 of these QCL relationships.

The UE 104 may transmit data and control information to the gNB 108 using physical uplink channels. Different types of physical uplink channels are possible including, for instance, a physical uplink control channel (PUCCH) and a physical uplink shared channel (PUSCH). Whereas the PUCCH carries control information from the UE 104 to the gNB 108, such as uplink control information (UCI), the PUSCH carries data traffic (e.g., end-user application data) and can carry UCI.

The UE 104 and the gNB 108 may perform beam management operations to identify and maintain desired beams for transmission in the uplink and downlink directions. The beam management may be applied to both PDSCH and PDCCH in the downlink direction, and PUSCH and PUCCH in the uplink direction.

The frequency bands for 5G networks, such as one described in FIG. 1, come in two sets: frequency range 1 (FR1) and frequency range 2 (FR2). FR1 covers communications from 450 megahertz (MHz) to 7.125 gigahertz (GHz), which includes the LTE frequency range. FR2 covers 24.25 GHz to 52.6 GHz. FR2 is known as the millimeter wave (mmWave) spectrum. Studies and developments are ongoing for communication over NR in the unlicensed band above FR2. For example, industry interest is developing in a spectrum above the 52.6 GHz band, including frequencies larger than 52.6 GHz, such as, for example, between 52.6 GHz and 71 GHz. Radio waves in this band have wavelengths in the so-called millimeter band, and radiation in this band is known as millimeter waves. When operating at these frequencies, 5G NR enables both uplink and downlink operation in unlicensed and/or licensed bands and supports features, such as, for example, but not limited to, wideband carriers, flexible numerologies, dynamic time division duplex (TDD), beamforming, and dynamic scheduling/hybrid automatic repeat request (HARQ) timing. Frequencies between 52.6 GHz and 71 GHz are interesting because of proximity to sub-52.6 GHz (current NR system) and imminent commercial opportunities for high data rate communications, such as in the (un)licensed spectrum between 52.6 GHz and 71 GHz, 52.6 GHz and 114.25 GHz, 71 GHz and 114.25 GHz, or any other spectrum where subcarrier spacing larger 120 KHz may be needed to mitigate phase noise.

In above 52.6 GHz transmission, the subcarrier spacing (SCS) is increased to provide robustness to phase noise. In one embodiment, subcarrier spacings that are supported by UEs and gNB (or other network nodes) are a group of subcarrier spacings that includes 120, 240, 480, 960, and 1920 KHz. However, the group of subcarrier spacings may include less than all of these subcarrier spacings and/or may include other subcarrier spacings. The 120 KHz subcarrier spacing is currently used for data in FR2. 240 KHz subcarrier spacing is used for synchronization signal block (SSB) in FR2. Studies are underway about the feasibility of re-using the 120 KHz subcarrier spacing for the spectrum above 52.6 GHz. The remaining subcarrier spacings are also under study and will likely require implementation changes. Some of these implementation changes are described herein and relate to communication scheduling and HARQ processing.

In particular, the increase in subcarrier spacing beyond 120 KHz (e.g., 240 KHz and larger) causes implementation challenges related to communication scheduling and the HARQ processing. This increase results in a reduction in the size of the symbol (e.g., OFDM symbol). For example, comparing the 120 KHz subcarrier spacing with the 960 KHz subcarrier spacing, there is an eight-fold reduction in the size of the symbol. If the communication scheduling and HARQ processing procedures are not changed from 5G NR technical specification (e.g., when subcarrier spacing of 120 KHz or smaller is used), a UE may be required to increase some of its processing capabilities. In the previous example, the UE would have to perform up to eight times as much data and HARQ processing when comparing 120 KHz with 960 KHz.

Although embodiments of the present disclosure are described in connection with a frequency spectrum of 52.6 GHz or larger, the embodiments are not limited as such. Instead, the embodiments similarly apply to other frequency ranges. For instance, a particular frequency range may necessitate a particular range of subcarrier spacings. Given the relevant subcarrier spacings, communication scheduling and/or HARQ processing can be adjusted per the embodiments of the present disclosure.

Figure 2:
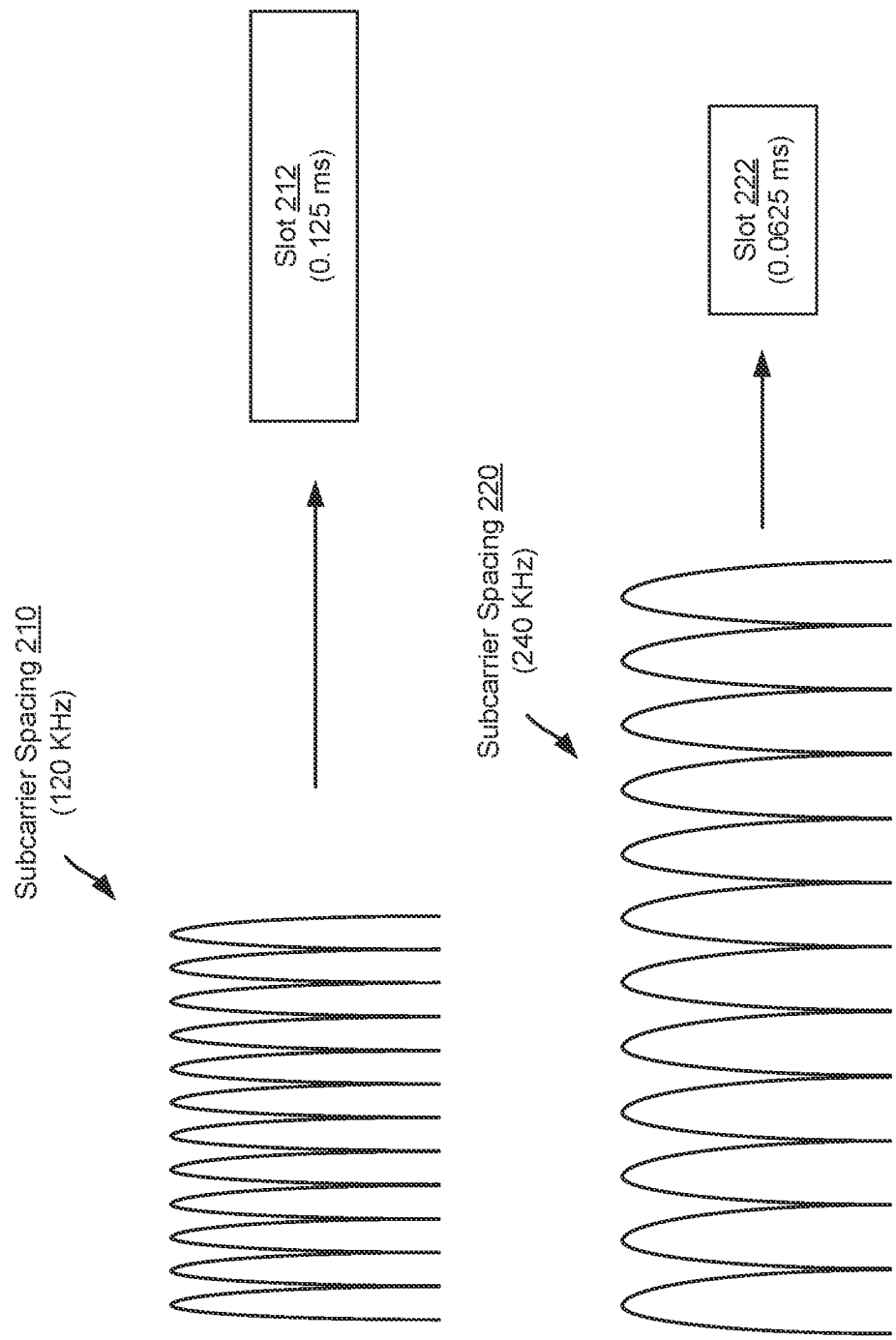
FIG. 2 illustrates examples of subcarrier spacing and slot length in accordance with some embodiments.

FIG. 2 illustrates examples of subcarrier spacing and slot length in accordance with some embodiments. Relative to previous generations of radio communications, 5G NR supports multiple different types of subcarrier spacing. For instance, whereas LTE supports 15 KHz only, 5G NR supports subcarrier spacings that 15 KHz, 30 KHz, 60 KHz, and 120 KHz, referred to with numerology "μ" of 0, 1, 2, and 3 in 3GPP TS 38.211 v16.3.0 (Oct. 1, 2020). Generally, a slot length depends on the numerology. A slot includes a number of symbols. When OFDM symbols are used (e.g., fourteen OFDM symbols in a slot) and are modulated using the subcarrier spacing, the resulting slot length acts shorter as the subcarrier spacing gets wider (or, equivalently, as the numerology increases).

In the illustration of FIG. 2, a comparison is made between a first subcarrier spacing 210, a second subcarrier spacing 220, and the resulting slot lengths. The first subcarrier spacing 210 is 120 KHz and, when used, the resulting length of a slot 212 is 0.125 milliseconds. In comparison, the second subcarrier spacing 240 is 240 KHz and, when used, the resulting length of a slot 222 is 0.0625 milliseconds. In other words, whereas the second subcarrier spacing 240 is double the first subcarrier spacing 210, the length of the slot 222 is half the length of the slot 212. Table 1 below summarizes the numerologies, subcarrier spacings, and the slot length for slots that include fourteen OFDM symbols.

TABLE 1

| μ | Subcarrier Spacing (KHz) | Slot length (millisecond) |
|---|---|---|
| 0 | 15 | 1 |
| 1 | 30 | 0.5 |
| 2 | 60 | 0.25 |
| 3 | 120 | 0.125 |
| 4 | 240 | 0.0625 |
| 5 | 480 | 0.03125 |
| 6 | 960 | 0.15625 |
| 7 | 1920 | 0.0078125 |

Figure 3:
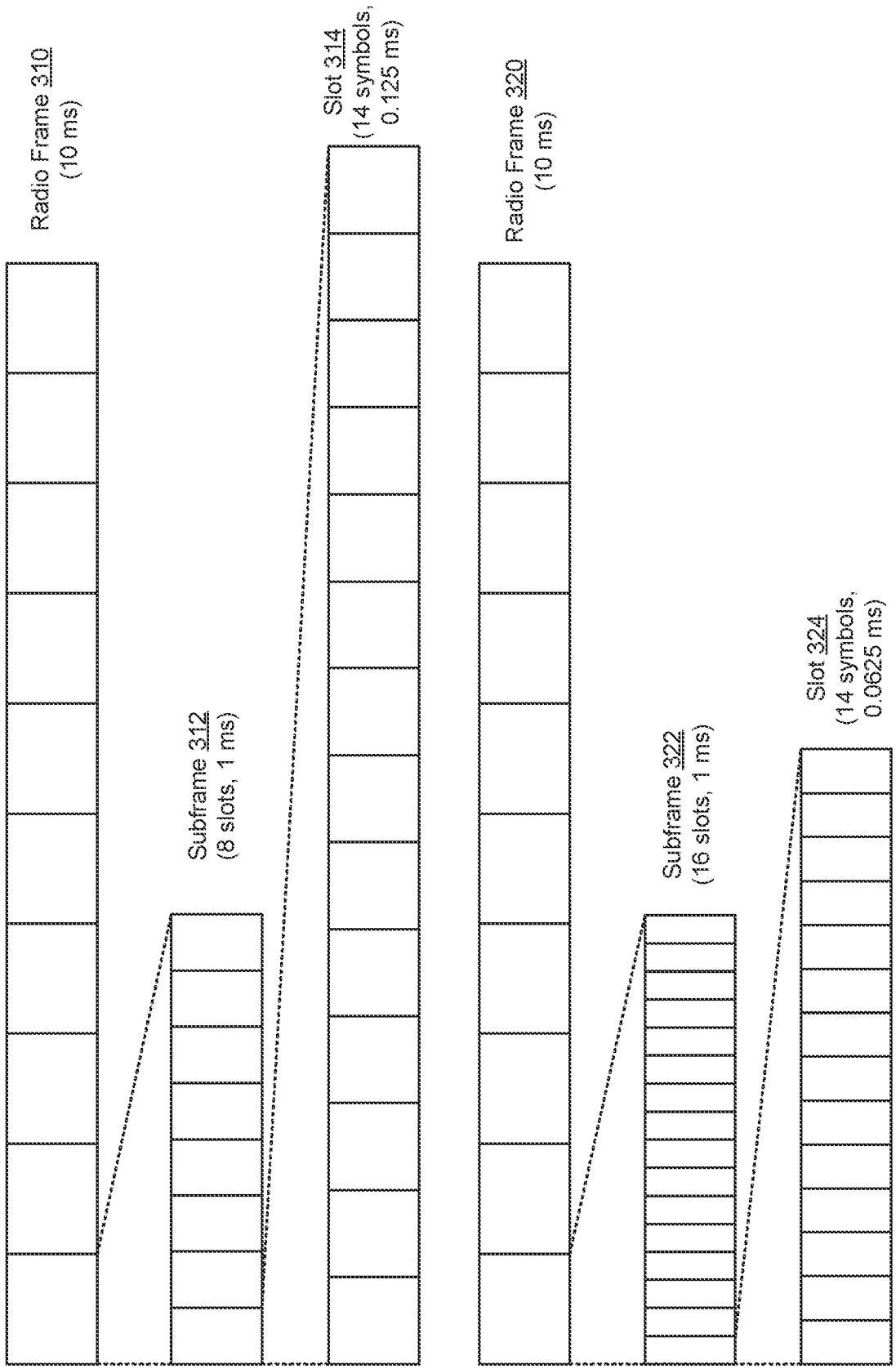
FIG. 3 illustrates examples of a frame structure in accordance with some embodiments.

FIG. 3 illustrates examples of a frame structure in accordance with some embodiments. Regardless of the subcarrier spacing, each of the length of a radio frame and the length of one sub-fame remains the same. The radio frame is ten milliseconds long and the sub-frame is one millisecond long. The change in the subcarrier spacing allows flexibility around the length of a slot and the number of slots within a sub-frame. The number of symbols within a slot may, but need not, change based on the subcarrier spacing, but can change depending on the slot configuration type. For slot configuration 0, the number of symbols in a slot is fourteen. In comparison, for slot configuration 1, this number is seven.

In the illustration of FIG. 3, a comparison is made between a first radio frame 310 and a second radio frame 320. The first radio frame 310 corresponds to a subcarrier spacing of 120 KHz, whereas the second radio frame 320 corresponds to a subcarrier spacing of 240 KHz. Both radio frames 310 and 320 have the same length of ten milliseconds. Both radio frames 310 and 320 also include ten sub-frames, each of which is one millisecond. However, the number and length of slots vary between the two radio frames 310 and 320.

A sub-frame 312 of the radio frame 310 includes eight slots. Because the sub-frame 312 is one millisecond long, each one of the eight slots is 0.125 milliseconds. As illustrated, a slot 314 of the sub-frame 312 includes fourteen symbols and is 0.125 milliseconds long. In comparison, a sub-frame 322 of the radio frame 320 includes sixteen slots. Because the sub-frame 322 is one millisecond long, each one of the sixteen slots is 0.0625 milliseconds. As illustrated, a slot 324 of the sub-frame 322 includes fourteen symbols and is 0.0625 milliseconds long. Hence, the radio frame 320 includes twice the number of slots and symbols as the radio frame 310, although their lengths are the same. This comparison similarly applies to other subcarrier spacing. For instance, relative to a radio frame at the 120 KHz subcarrier spacing, a radio frame at 480 KHz subcarrier spacing includes four times the number of slots and symbols, a radio frame at 960 KHz subcarrier spacing includes eight times the number of slots and symbols, and a radio frame at 1920 KHz subcarrier spacing includes sixteen times the number of slots and symbols.

Figure 4:
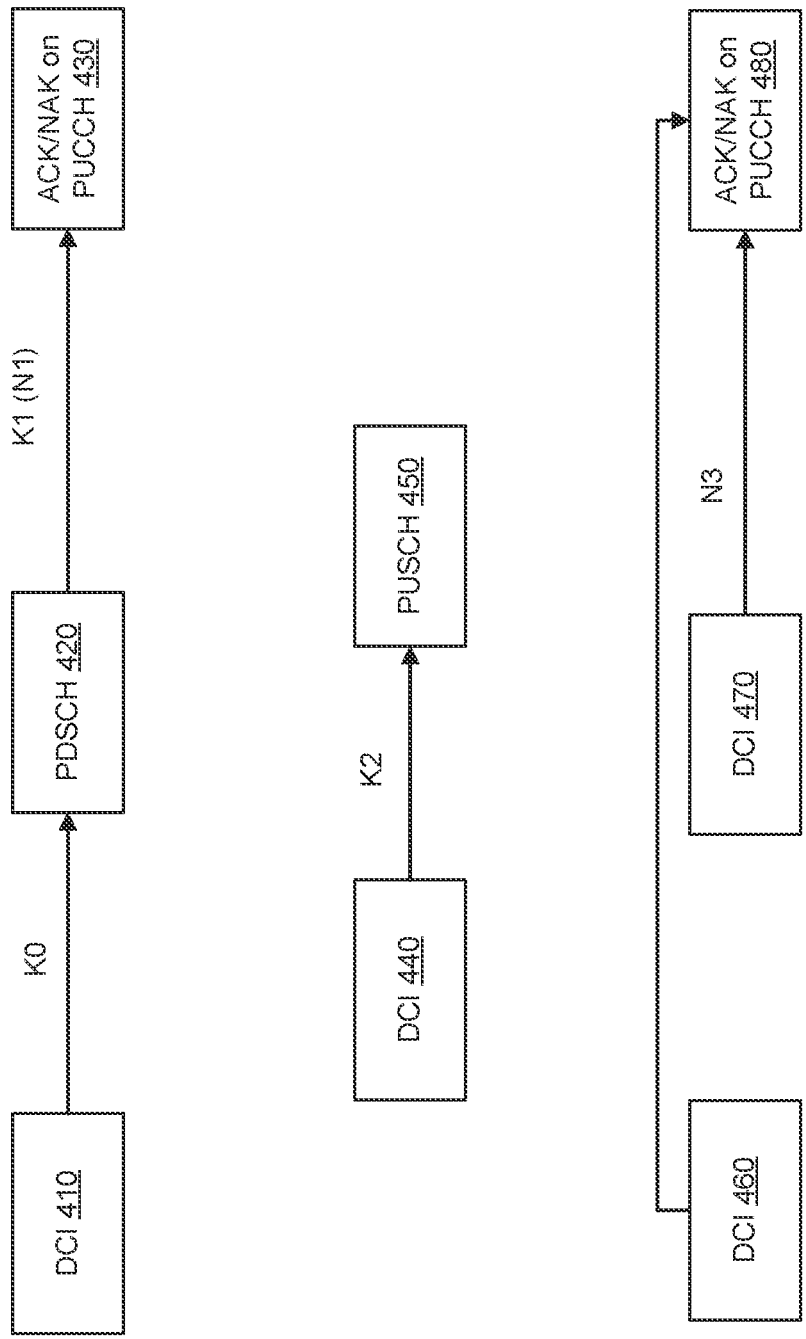
FIG. 4 illustrates an example of communication scheduling in accordance with some embodiments.

FIG. 4 illustrates an example of communication scheduling in accordance with some embodiments. Generally, communication scheduling is defined based on slots rather than actual time. Different types of communication are possible including, for instance, DCI reception, data reception, data transmission, and HARQ transmission. The communications can occur on a physical channel (downlink or uplink) that has a frequency larger than 52.6 GHz and can use a subcarrier spacing larger than 120 KHz (e.g., 240, 480, 960, and/or 1920 KHz).

In the present disclosure, reference is made to uplink slots and downlink slots. An uplink slot refers to a slot that can include symbols used to send uplink traffic (data and/or controls). The slot itself can also include symbols used to receive downlink traffic (data and/or controls). Conversely, a downlink slot refers to a slot that can include symbols used to receive downlink traffic and/or controls. The slot itself can also include symbols used to transmit uplink traffic and/or controls. In particular, 5G NR allows each slot to be either used for uplink traffic only (in which case, the slot is referred to herein as an uplink slot), downlink traffic only (in which case, the slot is referred to herein as a downlink slot), or both uplink traffic and downlink traffic (in which case, the slot is known as a flexible slot and is referred to herein as an uplink slot when reference is made to the uplink traffic and downlink slot when reference is made to the downlink traffic).

In the illustration of FIG. 4, a UE receives DCI 410 from a base station (e.g., on a PDCCH). The DCI 410 can have format 1_0, format 1_1, or format 1_2 and can schedule data reception (e.g., on a PDSCH 420) and HARQ transmission (e.g., acknowledgement/negative-acknowledgment (ACK/NAK) on a PUCCH 430). Scheduling of the data reception follows a slot offset (K0) from the DCI reception and scheduling of the HARQ feedback follows a slot offset (K1) from the data reception (or K0+K1 from the DCI reception). Newer DCI formats are possible (with release 17 or later of the 3GGP technical specification) and can be referred to herein as DCI format 1_x. Embodiments of the present disclosure similarly apply to DC format 1_x, whereby a slot offset (K) can depend on the subcarrier spacing using any of the techniques described in FIGS. 5-12.

The slot offset (K0) is the slot offset delay between downlink allocation and the downlink data reception. This slot offset delay can be defined as the number of slots between the downlink slot where the PDCCH (DCI) for downlink scheduling is received and the downlink slot where PDSCH data is scheduled. The slot offset (K1) is the slot offset delay between the downlink data reception and the corresponding HARQ feedback on the uplink (e.g., the HARQ codebook to be sent within an uplink slot on PUCCH for the downlink data reception). This slot offset delay can be defined as the number of slots between the downlink slot where the data is scheduled on PDSCH and the uplink slot where the ACK/NACK feedback for the scheduled PDSCH data need to be sent. The slot offset (K1) can be a function of the number of OFDM symbols (N1) required for UE processing from an end of the data reception to the earliest possible start of the HARQ transmission (e.g., from the end of PDSCH reception to earliest possible start of ACK/NAK transmission). Aspects of the slot offset (K0) and the slot offset (K1) are described in 3GPP TS 38.214 v16.3.0 (Oct. 2, 2020) and 3GPP TS 38.213 v16.3.0 (Oct. 2, 2020), respectively.

The UE also receives DCI 440 from the base station (e.g., on the PDCCH). The DCI 440 can have format 0_0, format 0_1 or format 0_2 and can schedule data transmission (e.g., on a PUSCH 450). Scheduling of the data transmission follows a slot offset (K2) from the DCI reception. The slot offset (K2) is the slot offset delay between the uplink grant reception in the downlink and the corresponding uplink data transmission. This slot offset delay can be defined as the number of slots between the downlink slot where the PDCCH(DCI) for uplink scheduling is received and the uplink slot where the uplink data need to be sent on PUSCH. The slot offset (K2) can be a function of the number of OFDM symbols (N2) from the DCI reception to the earliest possible start of the uplink data transmission (e.g., from PDCCH to earliest possible start of PUSCH). Aspects of the slot offset (K2) are described in 3GPP TS 38.214 v16.3.0 (Oct. 2, 2020).

In addition, the UE can receive multiple DCIs within a time frame (illustrated as first DCI 460 and second DCI 470) and, depending on their timings, can multiplex the corresponding HARQ feedback on an uplink channel. The possibility to perform the multiplexing depends on the number of symbols (N3) between the second DCI 470 and the first HARQ feedback transmission (e.g., the number of symbols between the downlink slot where the second DCI 470 is received and the uplink slot scheduled by the first DCI 460 for the transmission of the HARQ feedback). Aspects of the number of symbols (N3) are described in 3GPP TS 38.213 v16.3.0 (Oct. 2, 2020).

Because communication scheduling is defined based on slots rather than actual time and because the number of slots changes within a same unit of time depending on the subcarrier frequency, the amount of processing performed within the same unit of time also changes. As explained herein above, an increase to subcarrier spacing results in a decrease in the time length of a slot. Hence, within a same unit of time, the increase would necessitate additional slot-based processing. For instance, comparing the 120 KHz subcarrier spacing with the 240 KHz subcarrier spacing, there is two-fold reduction in the size of the slot. In one millisecond, eight slots need to be processed for the 120 KHz subcarrier spacing, whereas sixteen slots need to be processed for the 240 KHz subcarrier spacing. In other words, a device, such as the UE 104, would have to perform in the same unit of time up to two times as much HARQ and data processing for 240 KHz subcarrier spacing relating to 120 KHz subcarrier spacing. To mitigate the processing impact, the communication scheduling (e.g., timelines between DCI reception, data reception, data transmission, and/or HARQ feedback transmission) can account for the change to the lengths of slots such that, within the same unit of time, the amount of processing is not significantly increased, if any. Embodiments for such type of communication scheduling are described herein.

Referring back to the above slot offsets and number of OFDM symbols, the UE processing time depends on such parameters that, in turn, depend on the subcarrier spacing. For example, per 3GPP TS 38.214 v16.3.0 (Oct. 2, 2020), "if the first uplink symbol of the PUCCH which carries the HARQ-ACK information, as defined by the assigned HARQ-ACK timing K1 and the PUCCH resource to be used and including the effect of the timing advance, starts no earlier than at symbol L1, where L1 is defined as the next uplink symbol with its CP starting after $T_{proc,1}=(N_1+d_{1,1}+d_2)(2048+144)\cdot\kappa 2^{-\mu}\cdot T_c+T_{ea}$ after the end of the last symbol of the PDSCH carrying the TB being acknowledged, then the UE shall provide a valid HARQ-ACK message" and "N1 is based on μ of table 5.3-1 and table 5.3-2 for UE processing capability 1 and 2 respectively." These two tables are copied herein below for reference as Table 2 and Table 3, respectively.

TABLE 2

| | PDSCH decoding time $N_1$ [symbols] | |
|---|---|---|
| μ | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

TABLE 3

| μ | PDSCH decoding time $N_1$ [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | 9 for frequency range 1 |

As shown in the above two tables, with an increase to the numerology "μ" (e.g., the subcarrier spacing), the number of OFDM symbols (N1) increases and the processing time (e.g., $T_{proc,1}$) increases.

Similarly, per 3GPP TS 38.214 v16.3.0 (Oct. 2, 2020), "If the first uplink symbol in the PUSCH allocation for a transport block, including the DM-RS, as defined by the slot offset K2 and the start and length indicator SLIV of the scheduling DCI and including the effect of the timing advance, is no earlier than at symbol L2, where L2 is defined as the next uplink symbol with its CP $T_{proc,2}=$ max$((N_2+d_{2,1}+d_2)(2048+144)\cdot 2^{-\mu}\cdot T_c+T_{ext}+T_{switch}, d_{2,2})$ after the end of the reception of the last symbol of the PDCCH carrying the DCI scheduling the PUSCH, then the UE shall transmit the transport block" and "N2 is based on µ of Table 6.4-1 and Table 6.4-2 for UE processing capability 1 and 2 respectively." These two tables are copied herein below for reference as Table 4 and Table 5, respectively.

TABLE 4

| µ | PUSCH preparation time $N_2$ [symbols] |
|---|---|
| 0 | 10 |
| 1 | 12 |
| 2 | 23 |
| 3 | 36 |

TABLE 5

| µ | PUSCH preparation time $N_2$ [symbols] |
|---|---|
| 0 | 5 |
| 1 | 5.5 |
| 2 | 11 for frequency range 1 |

Here also, as shown in the above two tables, with an increase to the numerology "µ" (e.g., the subcarrier spacing), the number of OFDM symbols (N2) increases and the processing time (e.g., $T_{proc,2}$) increases.

As far as the number of OFDM symbols (N3), 3GPP TS 38.213 v16.3.0 (Oct. 2, 2020) describes that "If a UE detects a first DCI format indicating a first resource for a PUCCH transmission with corresponding HARQ-ACK information in a slot and also detects at a later time a second DCI format indicating a second resource for a PUCCH transmission with corresponding HARQ-ACK information in the slot, the UE does not expect to multiplex HARQ-ACK information corresponding to the second DCI format in a PUCCH resource in the slot if the PDCCH reception that includes the second DCI format is not earlier than $N_3\cdot(2048+144)\cdot\kappa\cdot 2^{-\mu}\cdot T_c$ from the beginning of a first symbol of the first resource for PUCCH transmission in the slot where, κ and T_c are defined in clause 4.1 of [4, TS 38.211] and corresponds to the smallest SCS configuration among the SCS configurations of the PDCCHs providing the DCC formats and the SCS configuration of the PUCCH." Using this timing formula, with an increase to the numerology "µ" (e.g., the subcarrier spacing), the number of OFDM symbols (N3) increases and the processing time increases.

In addition to processing time impact, the change to the subcarrier spacing can impact aspects of HARQ processing. Two types HARQ codebooks are defined: Type 1 codebook (semi-static) and Type 2 codebook (dynamic). In the Type 1 codebook, the size of the HARQ codebook is fixed by RRC signaling and depends on the DCI format used to allocates resources. With DCI format 1_0 (fallback DCI), the size can be set from eight consecutive slots. DCI format 1_1 (non-fallback DCI) includes an indicator indicating the size, such as a PDSCH-to-HARQ_feedback timing indicator' field usable to select up to eight values within the range from zero to fifteen: {0,1,5,7,9,10,11,15} from dl-data-to-ULACK

```
PUCCH-Config ::= SEQUENCE {
dl-DataToUL-ACK SEQUENCE (SIZE (8)) OF INTEGER (0..15)
OPTIONAL, -- Need M
}.
```

Type 1 codebook is robust to UE failing to detect/decode a resource allocation on the PDSCH. However, its fixed size can result in a large overhead. For Type 2 codebook, the size changes based on the number of resource allocations. This codebook defines a counter Dynamic Assignment Index (cDAI) and a total Dynamic Assignment Index (tDAI). The cDAI included in the DCI indicates the number of scheduled downlink transmissions up to the point the DCI was received in a carrier first, time second manner. The tDAI included in the DCI indicates the total number of downlink transmissions across all carriers up to this point in time (e.g., the highest cDAI at current point in time). The Type 2 codebook is sent using the DAI field in DCAI format 1_0 (cDAI only) as a two-bit field, and DCI format 1_1 (cDAI and tDAI) as a four-bit field. The gNB requests for HARQ transmission using first/second DAI in DCI format 0_1, where two-bit fields are used to indicate the total DAI (e.g., the total number of HARQ ACKs to be returned to the gNB). Relative to the Type 1 codebook, the Type 2 codebook is less robust but more resource efficient.

Given a larger subcarrier spacing (a smaller symbol duration), the number of symbols required for processing (e.g., PDSCH (N1)) increases, as explained herein above. The increase impacts the delay between downlink data reception and corresponding HARQ-ACK feedback on the uplink and its associated signaling (e.g., with N1), the delay between DCI reception and uplink transmission (e.g., with N2), the overhead required by the HARQ codebook that needs to be fed back, the UE timeline requirements for multiplexing multiple HARQ ACKs in a feedback (e.g., with N1 or N2 and N3), and the number of HARQ ACK processes needed.

It is possible to consider modifications to the number of OFDM symbols N1, N2, and N3 to mitigate the impacts. However, and as further described in the next figures, a better approach can be used by adopting the scheduling and the HARQ processing to the subcarrier spacing increase.

As far as N1, only PDSCH processing capability 1 is needed (e.g., referring back to Table 3, PDSCH processing capability 2 is already not considered beyond numerology "µ" of two corresponding to the 60 KHz subcarrier spacing). One option is to maintain $T_{proc,1}$ at the same value as the time processing for the 120 KHz subcarrier spacing ($T_{proc,1}$(120 KHz) Another option is to set $T_{proc,1}$ to be smaller than the time processing for the 120 KHz subcarrier spacing. Yet another option is to maintain N1 at the same value as the number of OFDM symbols for the 120 KHz subcarrier spacing (N1(120 KHz)). A further option is to set N1 to be smaller than the number of OFDM symbols for the 120 KHz subcarrier spacing. However, relative to the 120 KHz or smaller subcarrier spacing and for processing in a same unit of time, any of these four options leads to a large increase in the number of symbols (or, equivalently, slots) before HARQ feedback transmission. This conclusion is illustrated in Table 6 and Table 7 below based on the $T_{proc,1}$ definition. As a result, an increase to the slot offset (K1) is needed which, in turn, results in an increase to the memory size needed for symbol storage before HARQ feedback transmission, an increase to the number of HARQ processes, and modifications based on the limit to the HARQ resources.

TABLE 6

| μ | Subcarrier Spacing (KHz) | N1 |
|---|---|---|
| 0 | 15 | 8 |
| 1 | 30 | 10 |
| 2 | 60 | 17 |
| 3 | 120 | 20 |
| 4 | 240 | 40 |
| 5 | 480 | 80 |
| 6 | 960 | 160 |
| 7 | 1920 | 320 |

TABLE 7

| μ | Subcarrier Spacing (KHz) | N1 |
|---|---|---|
| 0 | 15 | 13 |
| 1 | 30 | 13 |
| 2 | 60 | 20 |
| 3 | 120 | 24 |
| 4 | 240 | 48 |
| 5 | 480 | 96 |
| 6 | 960 | 192 |
| 7 | 1920 | 284 |

The number of OFDM symbols (N1) in Table 6 is for dmrs-AdditionalPosition=pos0 in DMRS-DownlinkConfig in both of dmrs-DownlinkForPDSCH-MappingTypeA, dmrs-DownlinkForPDSCH-MappingTypeB. The values in the first four rows are also shots in Table 2. The values in the last four rows are based on $T_{proc,1}$. Although these last four values are linear, non-linear values can be also derived. Similarly, the number of OFDM symbols (N1) in Table 7 is for dmrs-AdditionalPosition≠pos0 in DMRS-DownlinkConfig in either of dmrs-DownlinkForPDSCH-MappingTypeA, dmrs-DownlinkForPDSCH-MappingTypeB or if the higher layer parameter is not configured. The values in the first four rows are also shown in Table 2. The values in the last four rows are based on $T_{proc,1}$. Although these last four values are linear, non-linear values can be also derived.

As far as N2, only PDSCH processing capability type 1 may be needed (e.g., referring back to Table 3, PDSCH processing capability type 2 is already not considered beyond numerology "μ" of two). One option is to maintain $T_{proc,2}$ at the same value as the time processing for the 120 KHz subcarrier spacing ($T_{proc,2}$(120 KHz)). Another option is to set $T_{proc,2}$ to be smaller than the time processing for the 120 KHz subcarrier spacing. Yet another option is to maintain N2 at the same value as the number of OFDM symbols for the 120 KHz subcarrier spacing (N2(120 KHz)). A further option is to set N2 to be smaller than the number of OFDM symbols for the 120 KHz subcarrier spacing. However, relative to the 120 KHz or smaller subcarrier spacing and for processing in a same unit of time, any of these four options leads to a large increase in the number of symbols (or, equivalently, slots) before PUSCH transmission. As a result, an increase to the slot offset (K2) and its associated signaling is needed which, in turn, results in an increase to the memory size needed for symbol storage before PUSCH transmission.

As far as N3, only PDSCH processing capability type 1 may be needed (e.g., referring back to Table 3, PDSCH processing capability type 2 is already not considered beyond numerology "μ" of two). One option is to maintain N3 at the same value as the number of OFDM symbols for the 120 KHz subcarrier spacing (N3(120 KHz)). Another option is to set N3 to be smaller than the number of OFDM symbols for the 120 KHz subcarrier spacing. However, relative to the 120 KHz or smaller subcarrier spacing and for processing in a same unit of time, any of these two options leads to a large increase in the number of symbols (or, equivalently, slots) before HARQ multiplexing. This results in an increase to the memory size needed for symbol storage or to a limit on the number of symbols transmitted.

Figure 13:
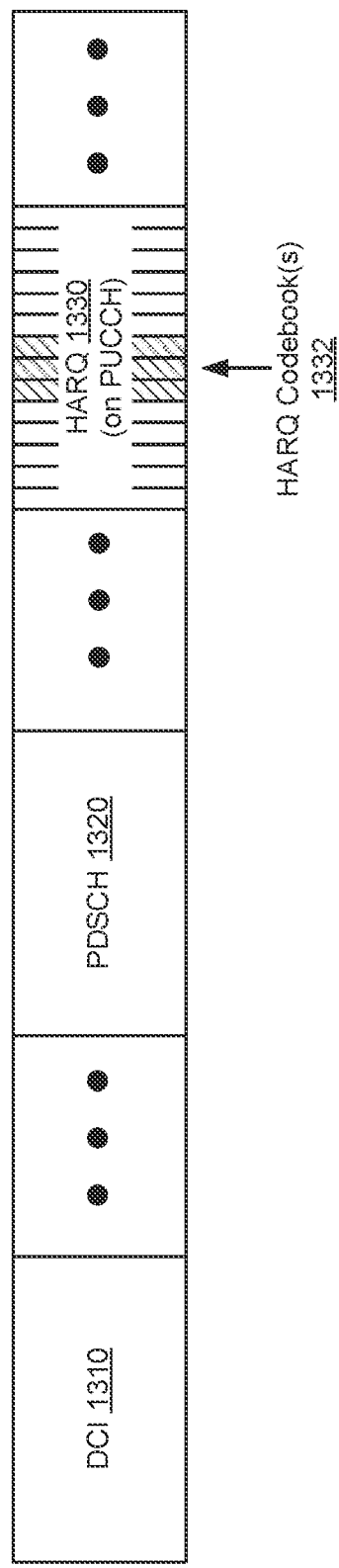
FIG. 13 illustrates an example of HARQ processing in accordance with some embodiments.
Figure 14:
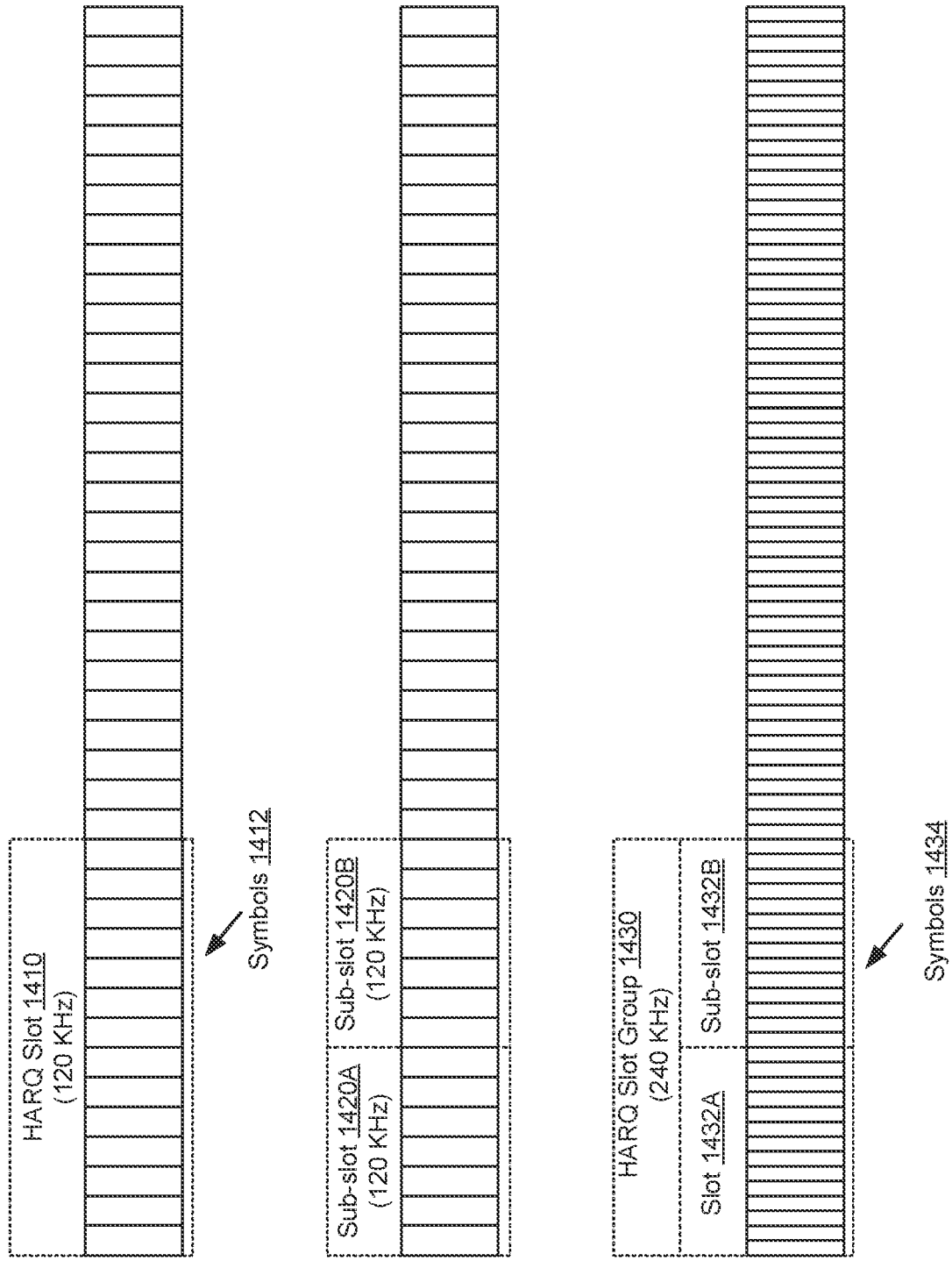
FIG. 14 illustrates an example of HARQ slot group-based processing in accordance with some embodiments.
Figure 15:
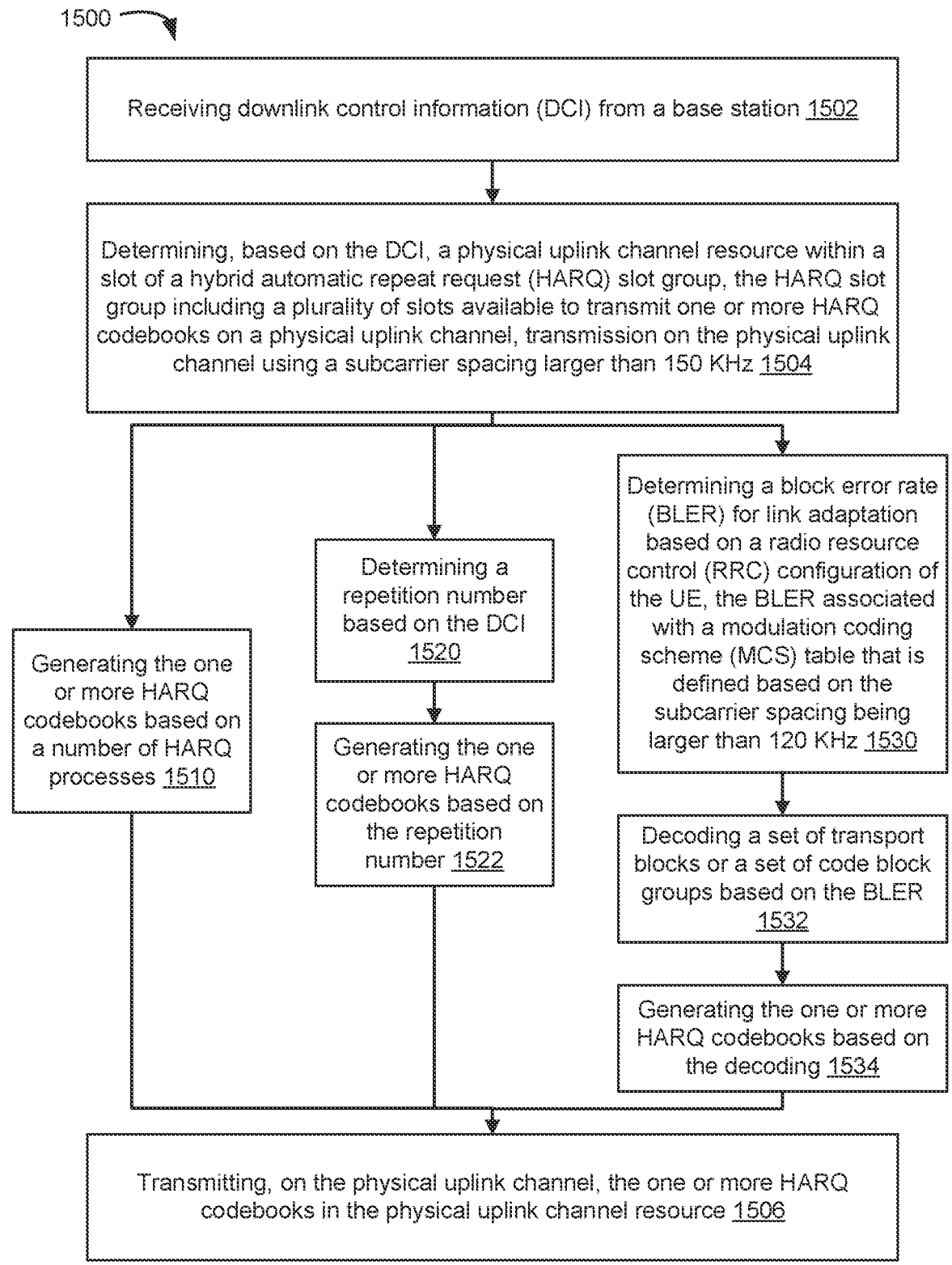
FIG. 15 illustrates an example of an operational flow/ algorithmic structure for HARQ slot group-based processing in accordance with some embodiments.

FIGS. 5-12 describe a scheduling-based approach to mitigate the impact of the increase to the number of symbols (or, equivalently, slots) upon an increase to the subcarrier spacing. FIGS. 13-15 describe a HARQ processing-based approach to mitigate this impact. The different approaches can be used independently of each other or in conjunction with each other.

Figure 5:
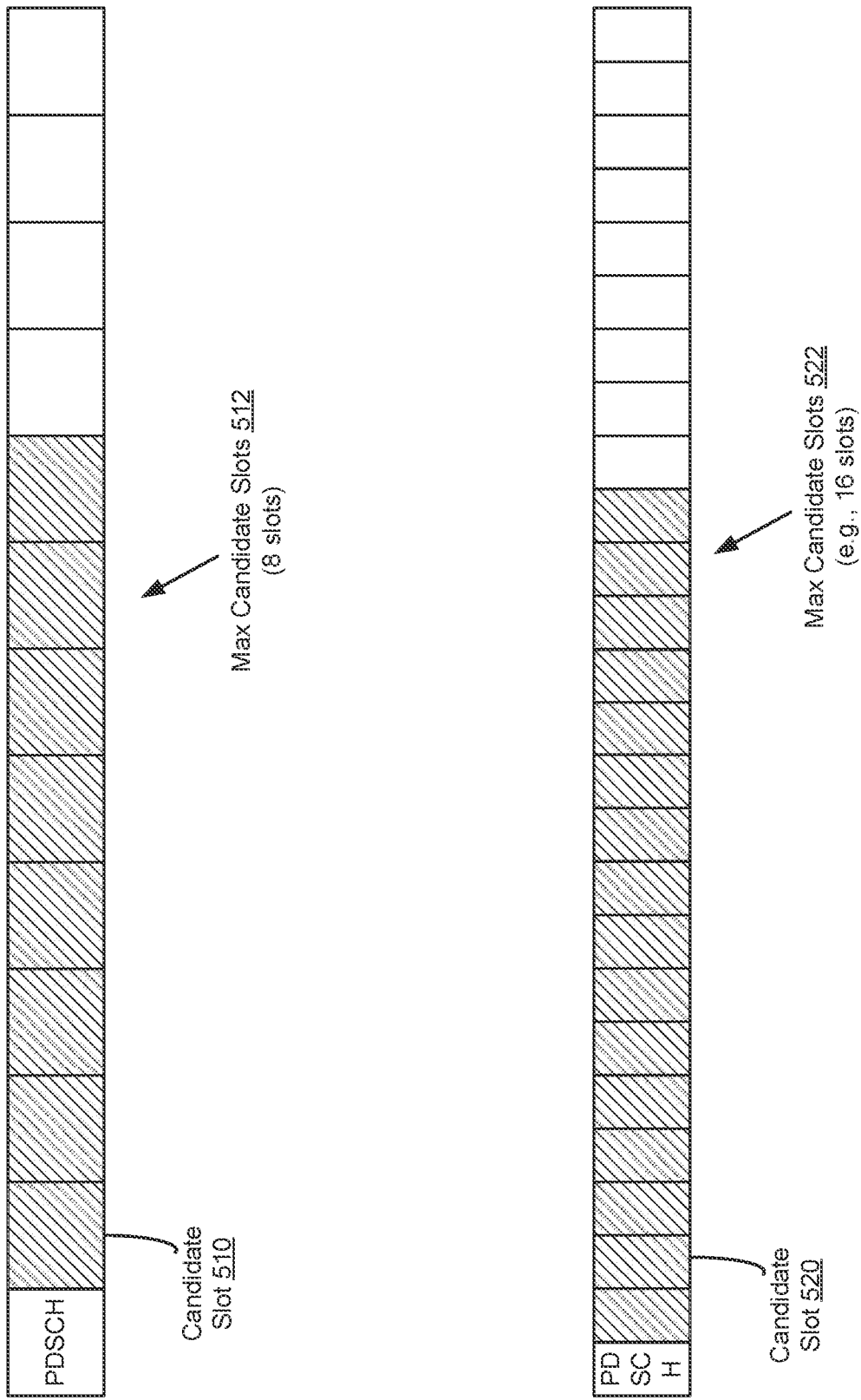
FIG. 5 illustrates an example of hybrid automatic repeat request (HARQ) slot-based scheduling that increases the number of candidate slots in accordance with some embodiments.

FIG. 5 illustrates an example of HARQ slot-based scheduling that increases the number of candidate slots in accordance with some embodiments. The illustrated scheduling relates to the slot offset (K1) between data reception and HARQ feedback transmission. In the particular illustration of FIG. 5, the use of DCI format 1_0 is illustrated. However, the embodiments similarly apply to DCI format 1_1 and 1_2, as further explained herein below.

In the upper part of FIG. 5, a number of slots is illustrated. These slots can be available for communication that uses 120 KHz or smaller subcarrier spacing. A downlink PDSCH slot is received by a UE. The DCI indicates that the HARQ feedback transmission can occur in an uplink PUCCH slot that has an offset relative to the downlink PDSCH slot. For example, the DCI includes a slot offset indicator about this offset. In the case of DCI format 1_0, the slot offset indicator can correspond to the "PDSCH-to-HARQ-timing-indicator" that is three bits and that is mapped to K1={1, 2, 3, 4, 5, 6, 7, 8}. Hence, with DCI format 1_0, a maximum of eight consecutive slots are candidate slots 512 for the HARQ feedback transmission. In particular, the uplink slot for the HARQ feedback transmission can be selected to be a candidate slot 510 from the candidate slots 512. For DCI format 1_1 and format 1_2, the "PDSCH-to-HARQ-timing-indicator" can be zero, one, two, or three bits long. 3GPP TS 38.212 v16.3.0 (Oct. 1, 2020), Table 9.2.3-1 (copied herein below as Table 8) provides a mapping between the "PDSCH-to-HARQ-timing-indicator" and the number of slots to send feedback "dl-DataToUL-ACK" in PUCCH-Config in RRC Reconfiguration message. The "PDSCH-to-HARQ-timing-indicator" can be mapped to up to fifteen consecutive slots that form the set of candidate slots 512.

TABLE 8

| PDSCH-to-HARQ_feedback timing indicator | | | |
|---|---|---|---|
| 1 bit | 2 bits | 3 bits | Number of slots k |
| '0' | '00' | '000' | $1^{st}$ value provided by dl-DataToUL-ACK or by dl-DataToUL-ACKForDCIFormat1_2 |
| '1' | '01' | '001' | $2^{nd}$ value provided by dl-DataToUL-ACK or by dl-DataToUL-ACKForDCIFormat1_2 |
| | '10' | '010' | $3^{rd}$ value provided by dl-DataToUL-ACK or by dl-DataToUL-ACKForDCIFormat1_2 |
| | '11' | '011' | $4^{th}$ value provided by dl-DataToUL-ACK or by dl-DataToUL-ACKForDCIFormat1_2 |
| | | '100' | $5^{th}$ value provided by dl-DataToUL-ACK or by dl-DataToUL-ACKForDCIFormat1_2 |
| | | '101' | $6^{th}$ value provided by dl-DataToUL-ACK or by dl-DataToUL-ACKForDCIFormat1_2 |
| | | '110' | $7^{th}$ value provided by dl-DataToUL-ACK or by dl-DataToUL-ACKForDCIFormat1_2 |
| | | '111' | $8^{th}$ value provided by dl-DataToUL-ACK or by dl-DataToUL-ACKForDCIFormat1_2 |

In the lower part of FIG. 5, a number of slots is also illustrated. However, these slots can be available for communication that uses subcarrier spacing larger than 120 KHz. A 240 KHz subcarrier spacing is illustrated for the purpose of comparison to the 120 KHz subcarrier spacing, but the embodiments similarly apply to larger subcarrier spacings. Generally, an uplink slot for the HARQ feedback transmission is determined to be a candidate slot from a set of candidate slots 522, where the size of this set is larger than that of the candidate slots 512. For instance, whereas with DCI format 1_0, up to eight consecutive candidate slots are available for the 120 KHz subcarrier spacing, this number can be increased to sixteen (or some other maximum) for the 240 KHz subcarrier spacing (and further increased for the larger subcarrier spacings). To do so, the "PDSCH-to-HARQ-timing-indicator" can be increased from three bits to "m" bits, where m is an integer larger than three (e.g., "m=4 bits" for 240 KHz subcarrier spacing resulting in a "$2^4$=16" consecutive slots as the upper limit on the set of candidate slots 522). Likewise, with DCI format 1_1 and format 1_2, the "PDSCH-to-HARQ-timing-indicator" can be increased from up to three bits to up "m" bits, where m is an integer larger than four (e.g., "m=5 bits" for 240 KHz subcarrier spacing resulting in a "$2^5$=32" consecutive slots as the upper limit on the set of candidate slots 522). Additionally or alternatively, because the "PDSCH-to-HARQ-timing-indicator" is mapped to "dl-DataToUL-ACK" (or "dl-DataToUL-ACKForDCIFormat1_2"), the size of "dl-DataToUL-ACK" (or "dl-DataToUL-ACKForDCIFormat1_2") can be increase to account for an increased number of slots (e.g., to thirty-slots for the 240 KHz subcarrier spacing).

In the upper and lower parts of FIG. 5, the DCI candidate slots 512 and 522 are offset from the downlink slot for the data reception (e.g., in the case of DCI format 1_0, the offset can be up to eight slots for the subcarrier spacing of 120 KHz and can be increased to a larger number of slots for the subcarrier spacing larger than 120 KHz). Because the DCI is received from a base station (e.g., gNB 108) and indicates a slot offset, this indicated slot offset is referred to herein as a base station-signaled slot offset. In the case of DCI format 1_0, format 1_1, or format 1_2, the base station-signaled slot offset is determined based on the "PDSCH-to-HARQ-timing-indicator" of the DCI.

Figure 6:
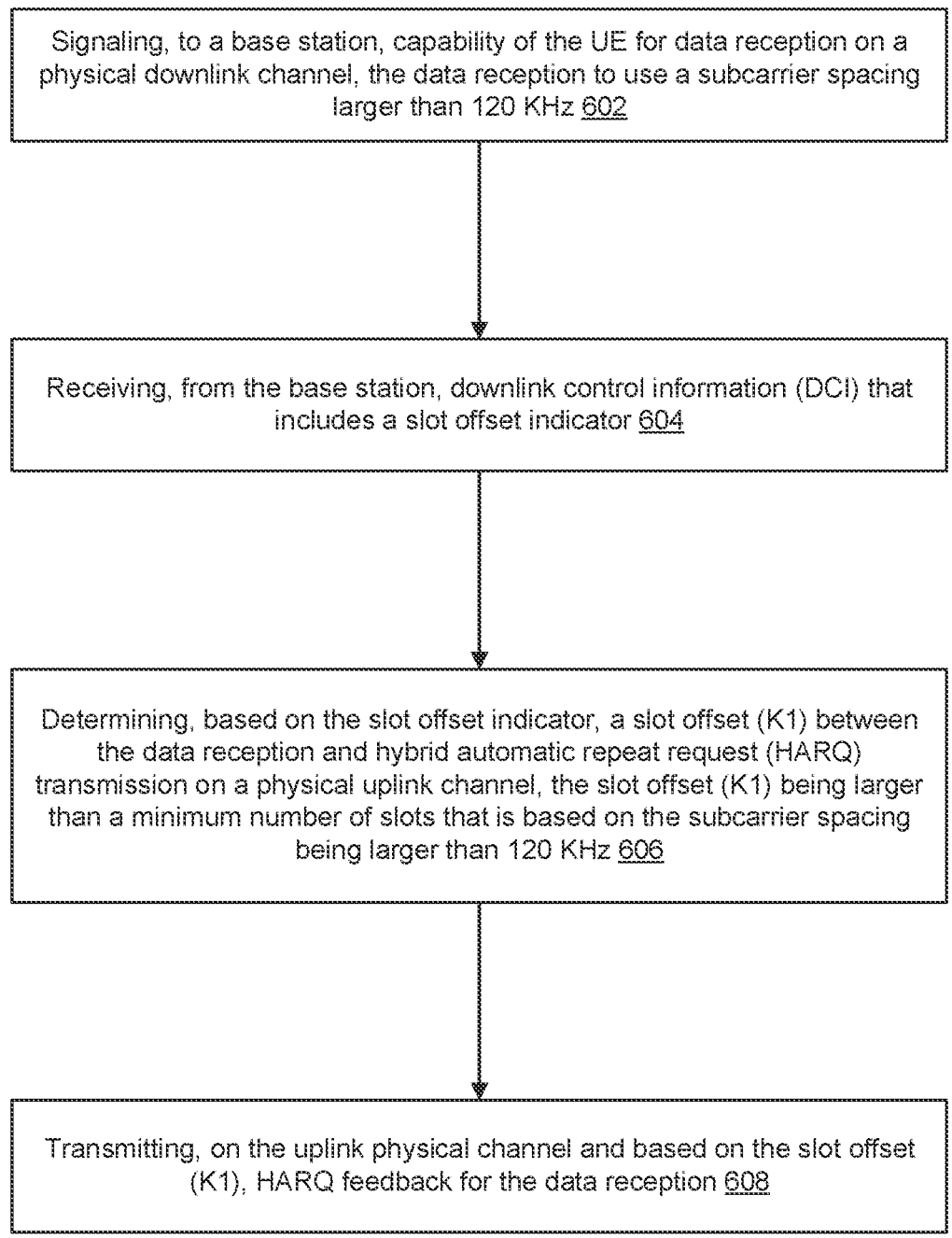
FIG. 6 illustrates an example of an operational flow/ algorithmic structure for HARQ slot-based scheduling that increases the number of candidate slots in accordance with some embodiments.

FIG. 6 illustrates an example of an operational flow/algorithmic structure 600 for HARQ slot-based scheduling that increases the number of candidate slots in accordance with some embodiments. A UE can implement the operational flow algorithmic structure 600 to determine the scheduling of HARQ feedback transmission and to transmit HARQ feedback accordingly. The operation flow/algorithmic structure 600 may be performed or implemented by the UE such as, for example, the UE 104, 1700, or components thereof, for example, processors 1704.

The operation flow/algorithmic structure 600 may include, at 602, signaling, to a base station, capability of the UE for data reception on a physical downlink channel that has a frequency larger than 52.6 GHz, the data reception to use a subcarrier spacing larger than 120 KHz. In some embodiments, the signaling can be RRC signaling.

The operation flow/algorithmic structure 600 may further include, at 604, receiving, from the base station, downlink control information (DCI) that includes a slot offset indicator. In some embodiments, the DCI has format 1_0, format 1_1, or format 1_2 and includes a "PDSCH-to-HARQ-timing-indicator" can schedule HARQ transmission on an uplink physical channel (e.g., PUCCH).

The operation flow/algorithmic structure 600 may further include, at 606, determining, based on the slot offset indicator, a slot offset (K1) between the data reception and hybrid automatic repeat request (HARQ) transmission on the physical uplink channel, the slot offset (K1) being larger than a minimum number of slots that is based on the subcarrier spacing being larger than 120 KHz. In some embodiments, the DCI has format 1_0, format 1_1, or format 1_2 and includes a "PDSCH-to-HARQ-timing-indicator." In the case of DCI format 1_0, the "PDSCH-to-HARQ-timing-indicator" can include more than three bits based on the subcarrier spacing being larger than 120 KHz. The value of the three bits indicate a set of candidate slots for the HARQ transmission. Similarly, in the case of DCI format 1_1 or format 1_2, the "PDSCH-to-HARQ-timing-indicator" can include more than three bits based on the subcarrier spacing being larger than 120 KHz. The value of the four bits are mapped to "dl-DataToUL-ACK" (or "dl-DataToUL-ACKForDCIFormat1_2") that indicates a set of candidate slots for the HARQ transmission. Additionally or alternatively (where "PDSCH-to-HARQ-timing-indicator" can include up to four bits), "dl-DataToUL-ACK" (or "dl-DataToUL-ACKForDCIFormat1_2") indicate the set of candidate slots, where this set is based on the subcarrier spacing being larger than 120 KHz.

The operation flow/algorithmic structure 600 may further include, at 608, transmitting, on the uplink physical channel and based on the slot offset (K1), HARQ feedback for the data reception. In some embodiments, the UE determines a scheduled uplink slot for the HARQ feedback transmission as being an uplink slot that is delayed from the downlink slot of the data reception (e.g., the PDSCH slot) by the slot offset (K1). The UE generates one or more HARQ codebooks that correspond to data reception (e.g., one or more PDSCH slots or sub-slots) and sends the HARQ codebook(s) in the scheduled uplink slot.

Figure 7:
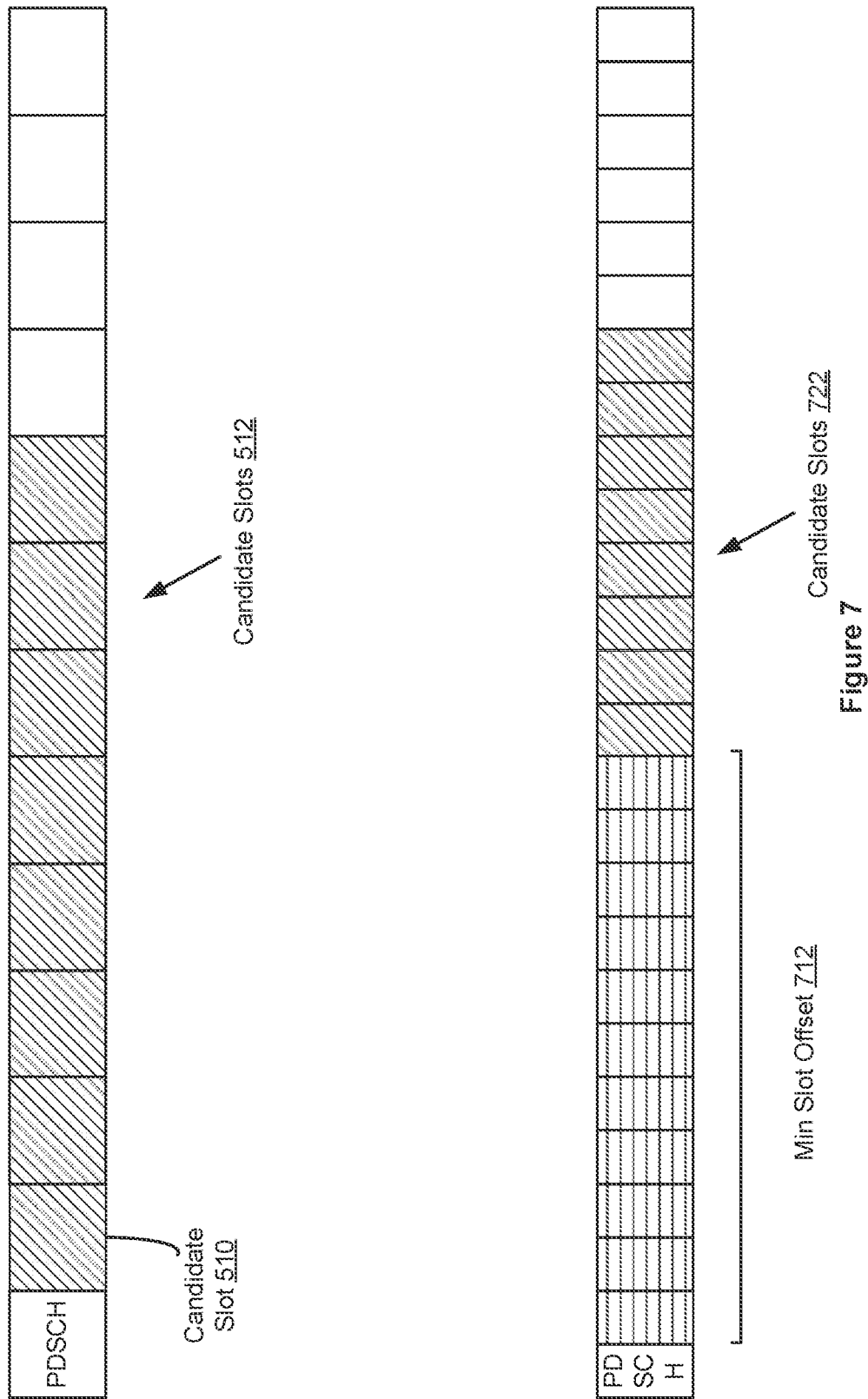
FIG. 7 illustrates an example of a HARQ slot-based scheduling that involves a minimum slot offset in accordance with some embodiments.

FIG. 7 illustrates an example of a HARQ slot-based scheduling that involves a minimum slot offset in accordance with some embodiments. Here, the upper portion of FIG. 7 is the same as the upper portion of FIG. 5 and the description thereof equally applies to FIG. 7 and is used herein for comparison purposes.

As illustrated in the lower part of FIG. 7, rather than increasing the size of candidate slot set (as in FIG. 5, where it increased from eight to sixteen), a minimum slot offset 710 is used. The same set size can be used for both the subcarrier spacing of 120 KHz or smaller and the subcarrier spacing of 240 KHz or larger and can be signaled by the DCI (e.g., the DCI indicates a base station-signaled slot offset, similar to the one described in FIG. 5). For example, in the case of DCI format up to eight candidate slots 722 are possible. In the case of DCI format 1_1 or format 1_2, up to fifteen candidate slots 722 are possible. Nonetheless, it may be possible to use a different (e.g., larger or smaller) set size for the subcarrier spacing of 240 KHz or larger.

The minimum slot offset 710 is the smallest number of slots that follow the downlink slot of the data reception (e.g., a PDSCH slot) and within which no HARQ feedback transmission for the data reception is scheduled (and, equivalently, no HARQ feedback for the data reception can be transmitted). The candidate slots 722 are delayed relative the downlink slot by the minimum slot offset 710. The minimum slot offset 710 can be signaled in an RRC message, indicated by the DCI (e.g., as another DCI field of one or more bits), or defined in a configuration of the UE (e.g., where this definition is captured in a 3GPP technical specification). Generally, the minimum slot offset 710 can be defined as a round-up or round-down integer equal to a ratio of (i) a number of OFDM symbols (N1) required for UE processing from an end of the data reception to the earliest possible start of the HARQ transmission to (ii) a number of symbols in a slot. For instance, per Table 6, the number of OFDM symbols (N1) is one-hundred sixty symbols for the 960 KHz subcarrier spacing. For slot configuration 0, the number of symbols in a slot is fourteen. Accordingly, in this illustration, the minimum slot offset 710 is eleven slots.

Figure 8:
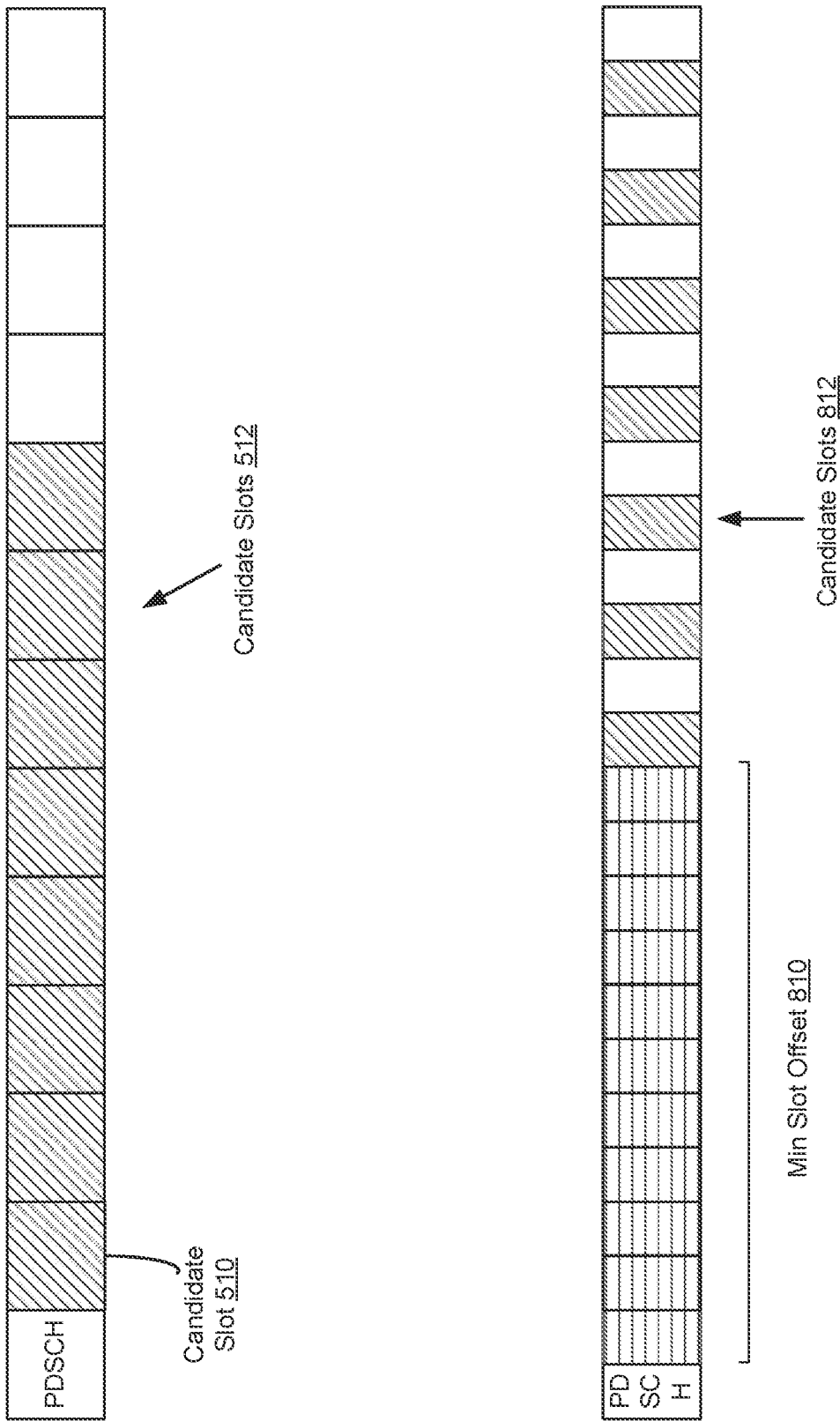
FIG. 8 illustrates an example of a HARQ slot-based scheduling that involves non-consecutive candidate slots having a uniform distribution in accordance with some embodiments.

FIG. 8 illustrates an example of a HARQ slot-based scheduling that involves non-consecutive candidate slots having a uniform distribution in accordance with some embodiments. Here, the upper portion of FIG. 8 is the same as the upper portion of FIG. 5 and the description thereof equally applies to FIG. 8. Further, similar to FIG. 7, the same set size of candidate slots can be used for both the subcarrier spacing of 120 KHz or smaller and the subcarrier spacing of 240 KHz or larger and can be signaled by the DCI (e.g., the DCI indicates a base station-signaled slot offset).

As illustrated in the lower part of FIG. 8, rather than using consecutive candidate slots (as in FIG. 7), non-consecutive candidate slots 812 having a uniform distribution are possible. The non-consecutive candidate slots 812 are equally-spaced per the uniform distribution. A minimum slot offset 810 may be used and can be similar to the minimum slot offset 710 of FIG. 7.

In the illustration of FIG. 8, the uniform distribution skips every other slot, resulting in the candidate slots 812 being spaced apart by one intermediate non-candidate slot (e.g., a slot that may not be used for HARQ feedback transmission). The uniformity can be defined by a slot_offset_multiplier that is used to multiply the base station-signaled slot offset, where the slot_offset_multiplier is a linear multiplier. For instance, if the base station-signaled slot offset is eight slots, the slot_offset_multipler can be set to two, and the multiplication results in a distribution of sixteen slots, therefore distributing the eight candidate slots 812 over sixteen slots that alternate between candidate and non-candidate slots.

Accordingly, the slot offset (K1) is based on the minimum slot offset, the slot_offset_multiplier, and the base station-signaled slot offset. The slot_offset_multiplier can be signaled in an RRC message, indicated by the DCI (e.g., as another DCI field of one or more bits), or defined in a configuration of the UE (e.g., where this definition is captured in a 3GPP technical specification).

Figure 9:
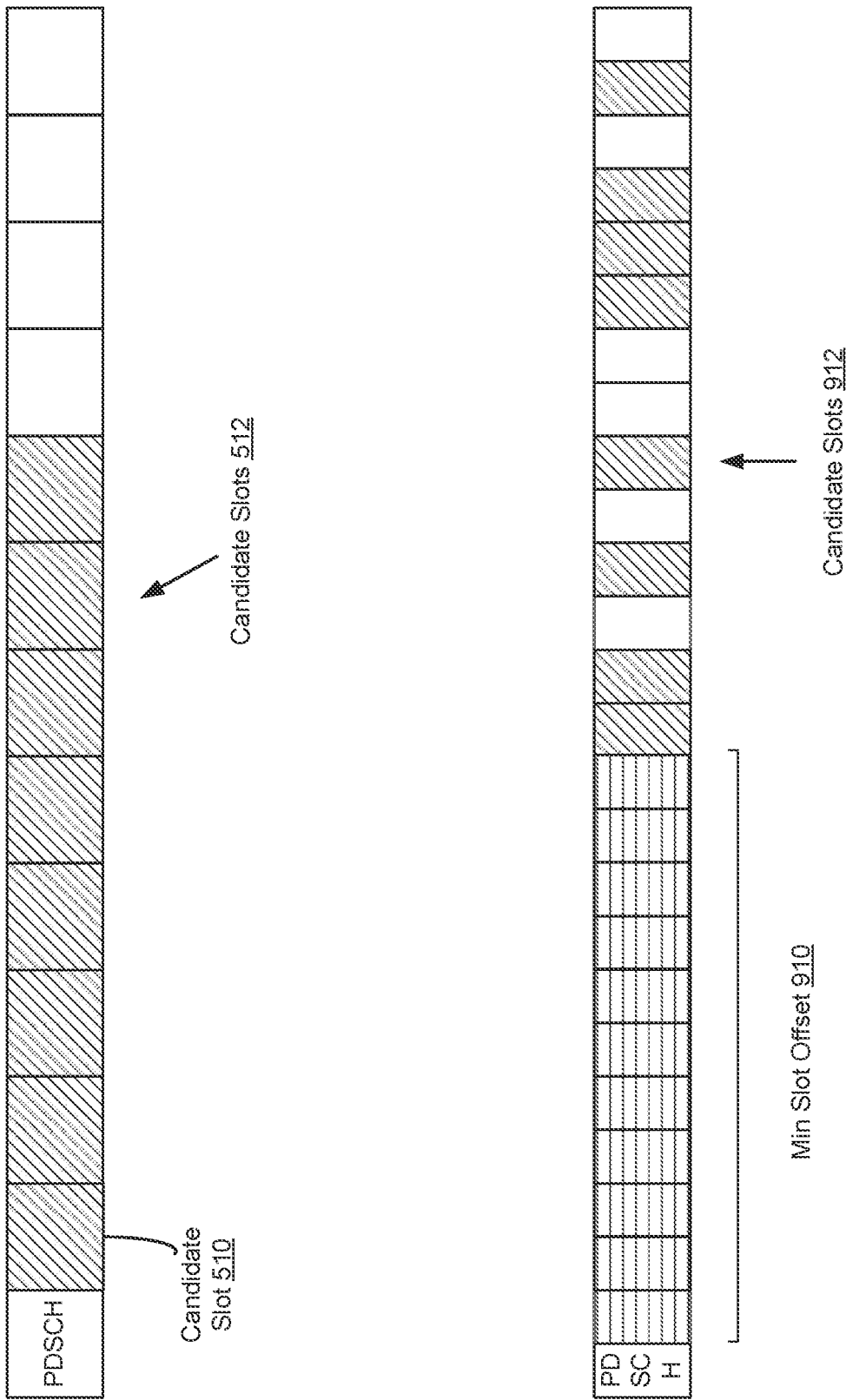
FIG. 9 illustrates an example of a HARQ slot-based scheduling that involves non-consecutive candidate slots having a non-uniform distribution in accordance with some embodiments.

FIG. 9 illustrates an example of a HARQ slot-based scheduling that involves non-consecutive candidate slots having a non-uniform distribution in accordance with some embodiments. Here, the upper portion of FIG. 9 is the same as the upper portion of FIG. 5 and the description thereof equally applies to FIG. 9. Further, similar to FIG. 8, the same set size of candidate slots can be used for both the subcarrier spacing of 120 KHz or smaller and the subcarrier spacing of 240 KHz or larger and can be signaled by the DCI (e.g., the DCI indicates a base station-signaled slot offset). In addition, a minimum slot offset 910 can be used and can be the same or different than the minimum slot offset 810 of FIG. 8.

As illustrated in the lower part of FIG. 9, rather than using a uniform distribution of non-consecutive candidate slots (as in FIG. 8), non-uniform distribution of candidate slots 912 is possible. The candidate slots 912 are not equally spaced. The non-uniformity can be defined by a slot_offset_multiplier that is used to multiply the base station-signaled slot offset, where the slot_offset_multiplier is a non-linear multiplier that varies from one candidate slot to the next. For instance, the slot_offset_multiplier can be defined using a pseudo-random function. In another illustration, a hash function can be used. In this illustration, a slot position hash is generated by at least hashing the base station-signaled slot offset.

Accordingly, the slot offset (K1) is based on the minimum slot offset, the slot_offset_multiplier, and the base station-signaled slot offset. The slot_offset_multiplier can be signaled in an RRC message, indicated by the DCI (e.g., as another DCI field of one or more bits), or defined in a configuration of the UE (e.g., where this definition is captured in a 3GPP technical specification).

In FIGS. 5-9, the candidate slots are shown with a diagonal pattern. In FIGS. 6-9, the minimum slot offsets are shown with a horizontal pattern. In the different embodiments of FIGS. 5-9, only PDSCH processing capability 1 is needed for subcarrier spacing larger than 120 KHz (e.g., referring back to Table 3, PDSCH processing capability 2 is already not considered beyond numerology "μ" of two corresponding to 60 KHz subcarrier spacing). In addition, the base station can dynamically configure and signal the slot offset (K1) to be specific to a UE and/or to a subcarrier spacing that the UE is using.

FIG. 10 illustrates an example of an operational flow/algorithmic structure 1000 for HARQ slot-based scheduling that involves a minimum slot offset in accordance with some embodiments. A UE can implement the operational flow/algorithmic structure 1000 to determine the scheduling of HARQ feedback transmission and to transmit HARQ feedback accordingly. The operation flow/algorithmic structure 1000 may be performed or implemented by the UE such as, for example, the UE 104, 1700, or components thereof, for example, processors 1704.

The operation flow/algorithmic structure 1000 may include, at 1002, receiving, from a base station, downlink control information (DCI) indicating a base station-signaled slot offset. In some embodiments, the DCI has format 1_0, format 1_1, or format 1_2 and includes a slot offset indicator that indicates the base-station signaled slot offset. The slot offset indicator can be, for instance, the "PDSCH-to-HARQ-timing-indicator."

The operation flow/algorithmic structure 1000 may include, at 1004, determining a minimum slot offset that is based on a subcarrier spacing of a physical downlink channel being larger than 120 KHz. In some embodiments, the minimum slot offset is determined front an RRC configuration of the UE, the DCI (e.g., from a field in the DCI), or a predefined configuration of the UE.

The operation flow/algorithmic structure 1000 may include, at 1006, determining, based on the minimum slot offset and the base station-signaled slot offset, a slot offset (K1) between data reception on the physical downlink channel and hybrid automatic repeat request (HARQ) transmission on a physical uplink channel, the physical downlink channel having a frequency larger than 52.10 gigaHertz (GHz). In some embodiments, the slot offset (K1) corresponds to a delay of the base station-signaled slot offset by the minimum slot offset, as in FIG. 7. In some additional or alternative embodiments, the slot offset (K1) is determined based on a linear or non-linear multiplier of the base-station signaled slot offset, as in FIGS. 8 and 9. The linear or non-linear multiplier can be determined from the RRC configuration of the UE, the DCI (e.g., from a field in the DCI), or the predefined configuration of the UE.

The operation flow/algorithmic structure 1000 may include, at 1008, transmitting, on the physical uplink channel and based on the slot offset (K1), HARQ feedback for the data reception. In some embodiments, the UE determines a scheduled uplink slot for the HARQ feedback transmission as being an uplink slot that is delayed from the downlink slot of the data reception (e.g., the PDSCH slot) by the slot offset (K1). The UE generates one or more HARQ codebooks that correspond to data reception (e.g., one or more PDSCH slots or sub-slots) and sends the HARQ codebook(s) in the scheduled uplink slot.

FIG. 11 illustrates examples of a slot-based scheduling for data reception or data transmission in accordance with some embodiments. The slot-based scheduling is indicated in DCI and schedules communication on a physical channel, where the physical channel has a frequency larger than 52.6 GHZ, and where the communication uses a subcarrier spacing larger than 120 KHz. The communication can be data reception, in which case the DCI has format 1_0, format 1_1, or format 1_2 and indicates a base station-signaled slot offset from which a slot offset (K0) is determined. The communication can be data transmission, in which case the DCI has format 0_0 or format 0_1 and indicates a base station-signaled slot offset from which a slot offset (K2) is determined.

Four options are illustrated in FIG. 11 and are usable independently of each other or in conjunction with each other. These four options are similar to the embodiments described in FIGS. 5, 7, 8, and 9, except that the scheduled downlink or uplink slot is for data communication rather than HARQ feedback transmission.

The first option is shown in the upper part of FIG. 11. In an example of this option, the size of the set formed by candidate slots 110 has a maximum number of slots, where the maximum number is based on the subcarrier spacing, similar to FIG. 5. Generally, the maximum number is greater than the maximum number used for the 120 KHz or smaller subcarrier spacing. In addition, the maximum number may increase with an increase to the subcarrier spacing over 120 KHz.

For instance, on the downlink, DCI format 1_0, format 1_1, or format 1_2 carries a four-bit field named "time domain resource assignment." The bit values of the "time domain resource assignment" are mapped to a row index of a look-up table (a default look-up table A, B, or C or an RRC-configured look up table referred to as "pdsch-TimeDomainAllocationList"). The default look-up tables A, B, and C are copied herein below from 3GPP TS 38.214 v16.3.0 (Oct. 2, 2020), and are labeled as Table 9, Table 10, and Table 11, respectively. To indicate the larger maximum number for subcarrier spacing over 120 KHz, the tables can be revised to include additional rows that allocate the additional number of candidate slots up to the maximum number and, optionally, the size of "time domain resource assignment" field can be increased to more than four bits to indicate the additional rows. In addition, for type 1 configured grants, the value of the timeDomainOffset can be increased. The slot offset (K0) can be determined from the existing or additional rows of the look-up table based on the "time domain resource assignment."

TABLE 9

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |

TABLE 9-continued

| Row index | dmrs-TypeA-Position | PDSCH mapping type | $K_0$ | S | L |
|---|---|---|---|---|---|
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

TABLE 10

| Row index | dmrs-TypeA-Position | PDSCH mapping type | $K_0$ | S | L |
|---|---|---|---|---|---|
| 1 | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 | 2, 3 | Type B | 1 | 2 | 2 |
| 7 | 2, 3 | Type B | 1 | 4 | 2 |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 (Note 1) | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
|   | 3 | Type A | 0 | 3 | 11 |
| 15 | 2, 3 | Type B | 1 | 2 | 4 |
| 16 |  | Reserved |  |  |  |

(Note 1):
If the PDSCH was scheduled with SI-RNTI in PDCCH Type0 common search space, the UE may assume that this PDSCH resource allocation is not applied

TABLE 11

| Row index | dmrs-TypeA-Position | PDSCH mapping type | $K_0$ | S | L |
|---|---|---|---|---|---|
| 1 (Note 1) | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 |  | Reserved |  |  |  |
| 7 |  | Reserved |  |  |  |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
|   | 3 | Type A | 0 | 3 | 11 |
| 15 (Note 1) | 2, 3 | Type A | 0 | 0 | 6 |
| 16 (Note 1) | 2, 3 | Type A | 0 | 2 | 6 |

(Note 1):
The UE may assume that this PDSCH resource allocation is not used, if the PDSCH was scheduled with SI-RNTI in PDCCH Type0 common search space Similarly, on the uplink, DCI format 0_0 or format 0_1 carries a four-bit field named "time domain resource assignment." The bit values of the "time domain resource assignment" are mapped to a look-up table (an RRC-configured look up table referred to as "pusch_TimeDomainAllocationList"). To indicate the larger maximum number for subcarrier spacing over 120 KHz, the look-up table can be revised to include additional rows that allocate the additional number of candidate slots up to the maximum and, optionally, the size of "time domain resource assignment" field can be increased to more than four bits to indicate the additional rows. In addition, for type 1 configured grants, the value of the timeDomainOffset can be increased. The slot offset (K2) can be determined from the existing or additional rows of the look-up table based on the "time domain resource assignment."

In an example, the second option uses a minimum slot offset 1112, similar to FIG. 7. Candidate slots 1114 are delayed from the DCI slot by the minimum slot offset 1112. The candidate slots 1114 form a set of consecutive slots and the size of the set may, but need not, be increased based on the subcarrier spacing being larger than 120 KHz as described in the first option.

The minimum slot offset 1112 can also be a function of the subcarrier spacing. Generally, the minimum slot offset 1112 is the smallest number of slots that follow the DCI and within which no data reception or data transmission is scheduled. For data reception, the minimum slot offset 1112 (K0min) can be defined as a round-up or round-down integer equal to a ratio of (i) a number of OFDM symbols (N0) required for UE processing from an end of the DCI reception to the earliest possible start of the data reception to (ii) a number of symbols in a slot. For instance, the number of OFDM symbols (N0) is seventy-two symbols for the 960 KHz subcarrier spacing. For slot configuration 0, the number of symbols in a slot is fourteen. Accordingly, in this illustration, the minimum slot offset (K0min) is five slots. For data transmission, the minimum slot offset 1112 (K2min) can be defined as a round-up or round-down integer equal to a ratio of (i) a number of OFDM symbols (N2) required for UE processing from an end of the DCI to the earliest possible start of the data transmission to (ii) a number of symbols in a slot. For instance, the number of OFDM symbols (N2) is seventy-two symbols for the 960 KHz subcarrier spacing. For slot configuration 0, the number of symbols in a slot is fourteen. Accordingly, in this illustration, the minimum slot offset (K2min) is five slots. The minimum slot offset 1112 (K0min or K2min) can be signaled in an RRC message, indicated by the DCI (e.g., as another field of one or more bits), or defined in a configuration of the UE (e.g., where this definition is captured in a 3GPP technical specification). For instance, the value of K0min is configured in the pdsch-TimeDomainAllocationList with pdsch-ConfigCommon or pudschConfig. The value of K2min is configured in the pusch-TimeDomainAllocationList with pusch-ConfigCommon or puschConfig.

Accordingly, the slot offset (K0 or K2) is based on the minimum slot offset and the base station-signaled slot offset.

In an example, the third option uses candidate slots 1116 that are non-consecutive but have a uniform distribution, similar to FIG. 8. A minimum slot offset may be used and can be the same or different than the minimum offset 1112. The size of the set formed by the candidate slots 1116 may, but need not, be increased based on the subcarrier spacing being larger than 120 KHz as described in the first option.

The uniform distribution skips every other slot (or some other distribution can be used), resulting in the candidate slots 1116 being spaced apart by one intermediate non-candidate slot (e.g., a slot that may not be used for data reception or transmission). The uniformity can be defined by a slot_offset_multiplier that is used to multiply the base station-signaled slot offset (e.g., the slot offset derived based on the time domain resource assignment), where the slot_offset_multiplier is a linear multiplier. For instance, if the base station-signaled slot offset is eight slots, the slot_offset_multiplier can be set to two, and the multiplication results in a distribution of sixteen slots, therefore distributing the eight candidate slots 1116 over sixteen slots that alternate between candidate and non-candidate slots.

Accordingly, the slot offset (K0 or K2) is based on the minimum slot offset, the slot_offset_multiplier, and the base station-signaled slot offset. The slot_offset_multiplier can be signaled in an RRC message, indicated by the DCI (e.g., as another field of one or more bits), defined in a configuration of the UE (e.g., where this definition is captured in a 3GPP technical specification), or added to a Start and Length Indicator (SLIV).

In an example, the fourth option uses candidate slots 1118 that have a non-uniform distribution, similar to FIG. 9. A minimum slot offset may be used and can be the same or different than the minimum offset 1112. The size of the set formed by the candidate slots 1118 may, but need not, be increased based on the subcarrier spacing being larger than 120 KHz as described in the first option.

The non-uniform distribution can be defined by a slot offset multiplier that is used to multiply the base station-signaled slot offset (e.g., the slot offset derived based on the time domain resource assignment), where the slot_offset_multiplier is a non-linear multiplier that varies from one candidate slot to the next. For instance, the slot offset multiplier can be defined using a pseudo-random function. In another illustration, a hash function can be used. In this illustration, a slot position hash is generated by at least hashing the base station-signaled slot offset.

Accordingly, the slot offset (K0 or K2) is based on the minimum slot offset, the slot_offset_multiplier, and the base station-signaled slot offset. For instance, the slot offset (K0 or K2) is equal to in the case of the random multiplier, or to. The slot_offset_multiplier can be signaled in an RRC message, indicated by the DCI (e.g., as another field of one or more bits), defined a configuration of the UE (e.g., where this definition is captured in a 3GPP technical specification), or added to a Start and Length Indicator (SLIV).

In FIG. 11, the candidate slots are shown with a diagonal pattern and the minimum slot offsets are shown with a horizontal pattern. In the different embodiments, only PDSCH processing capability 1 is needed for subcarrier spacing larger than 120 KHz (e.g., referring back to Table 3, PDSCH processing capability 2 is already not considered beyond numerology "μ" of two corresponding to a 60 KHz subcarrier spacing). In addition, the base station can dynamically configure and signal the slot offset (K0 or K2) to be specific to a UE and/or to a subcarrier spacing that the UE is using.

Figure 12:
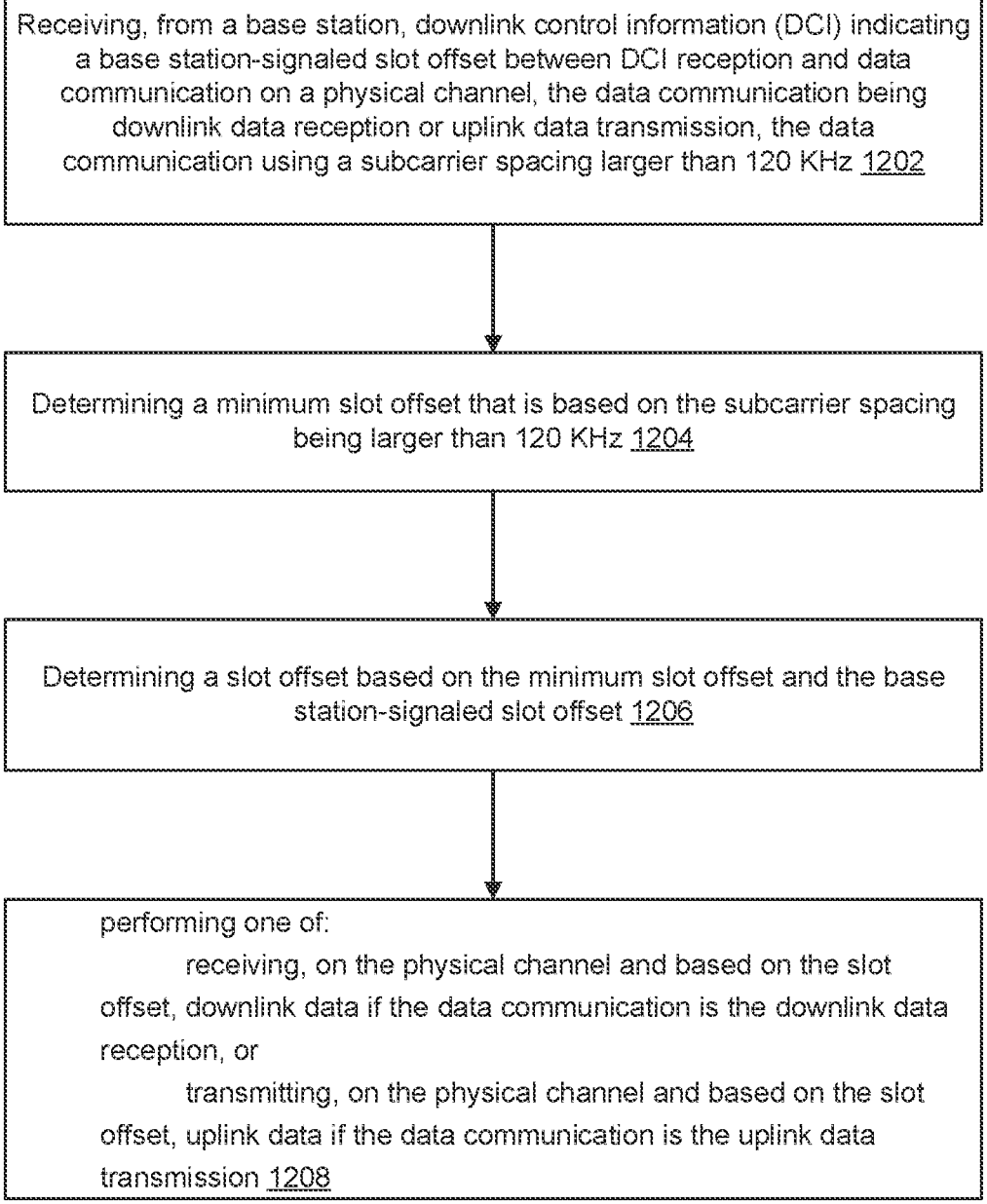
FIG. 12 illustrates an example of an operational flow/ algorithmic structure for slot-based scheduling for data reception or data transmission in accordance with some embodiments.

FIG. 12 illustrates an example of an operational flow/algorithmic structure 1200 for slot-based scheduling for data reception or data transmission in accordance with some embodiments. A UE can implement the operational flow/algorithmic structure 1200 to determine the scheduling of communication on a physical channel that has a frequency larger than 52.6 GHz (e.g., data reception on PDSCH or data transmission on PUSCH), where the communication uses a subcarrier spacing larger than 120 KHz. The operation flow/algorithmic structure 1200 may be performed or implemented by the UE such as, for example, the UE 104, 1700, or components thereof, for example, processors 1704.

The operation flow/algorithmic structure 1200 may include, at 1202, receiving, from a base station, downlink control information (DCI) indicating a base station-signaled slot offset between DCI reception and data communication on a physical channel, the data communication being downlink data reception or uplink data transmission, the physical channel having a frequency larger than 52.6 GHz, the data communication using a subcarrier spacing larger than 120 KHz. In some embodiments, the DCI has format 1_0, format 1_1, or format 1_2 for the data reception, or format 0_0 or format 0_1 for the data transmission. The DCI includes a slot offset indicator that indicates the base-station signaled slot offset. The slot offset indicator can be, for instance, the "time domain resource assignment."

The operation flow/algorithmic structure 1200 may include, at 1204, determining a minimum slot offset that is based on the subcarrier spacing being larger than 120 KHz. In some embodiments, the minimum slot offset is determined from an RRC configuration of the UE, the DCI (e.g., from a field in the DCI), a predefined configuration of the UE.

The operation flow/algorithmic structure 1200 may include, at 1206, determining a slot offset based on the minimum slot offset and the base station-signaled slot offset. In some embodiments, the slot offset (K0) is determined for the data reception and/or the slot offset (K2) is determined for the data transmission. In some embodiments, the slot offset (K0 or K2) corresponds to a delay of the base station-signaled slot offset by the minimum slot offset, as in FIG. 11. In some additional or alternative embodiments, the slot offset (K0 or K2) is determined based on a linear or non-linear multiplier of the base-station signaled slot offset, as in FIG. 11. The linear or non-linear multiplier can be determined from the RRC configuration of the UE, the DCI (e.g., from a field in the DCI), the predefined configuration of the UE, or a SLIV.

The operation flow/algorithmic structure 1200 may include, at 1208, performing one of: receiving, on the physical channel and based on the slot offset, downlink data if the data communication is the downlink data reception, or transmitting, on the physical channel and based on the slot offset, uplink data if the data communication is the uplink data transmission. When the DCI has format 1_0, format 1_1, or format 1_2, the data reception is performed. When the DCI has format 0_0 or format 0_1, the data transmission is performed. In some embodiments, the UE determines, as applicable, a scheduled downlink slot for the data reception or a scheduled uplink slot for the data transmission, where the scheduled slot is delayed from the DCI slot by the slot offset (K0 in the case of a scheduled downlink slot, or K2 in the case of a scheduled uplink slot). As applicable, the UE receives and processes data from the scheduled downlink slot or processes and transmits data in the scheduled uplink slot.

FIGS. 13-15 illustrate another approach to mitigating the impact of subcarrier spacing larger than 120 KHz to HARQ processing. HARQ feedback transmission can, but need not, be scheduled according to the embodiments described in FIGS. 5-10. Data for which HARQ feedback is to be generated can, but need not, be scheduled according to embodiments described in FIGS. 11-12.

FIG. 13 illustrates an example of HARQ processing in accordance with some embodiments. DCI 1310 is received by a UE and schedules data reception (illustrated as PDSCH 1320) and HARQ feedback transmission (illustrated as HARQ 1330 on PUCCH) by the UE. The downlink data slot is delayed relative to the DCI slot by the slot offset (K0). The uplink HARQ slot is delayed relative to the downlink data slot by the slot offset (K1). These two slot offsets (K0 and K1) can be base station-signaled slot offsets or can be set according to the embodiments described in FIGS. 5-12.

Within the HARQ slot 1330, the UE determines specific symbols (illustrated in FIG. 13 with a diagonal pattern) to use for the transmission of a set of HARQ codebooks 1332. This determination uses the slot offset (K1) and the SLIV, where the slot offset (K1) indicates the uplink slot to use, and the SLIV indicates the start (e.g., first symbol) and the length (e.g., number of symbols) within the uplink slot for the HARQ transmission as defined in a PUCCH resource table. The PUCCH resource table can be predefined (e.g., Table 12 below is an example copied from 38.213 V16.2.0) or defined using an RRC message.

TABLE 12

| Index | PUCCH format | First symbol | Number of symbols | PRB offset $RB_{BWP}^{offset}$ | Set of initial CS indexes |
| --- | --- | --- | --- | --- | --- |
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

When subcarrier spacing larger than 120 KHz is used, the HARQ processing can be performed on a group of slots basis, rather than an individual slot basis. In particular, a set of slots can be aggregated to function as a single HARQ group, and this set is referred to herein as a HARQ slot group. In other words, a HARQ slot group represents a set of two or more slots within which a set of HARQ codebooks can be transmitted.

In a simple illustration, the HARQ slot group is two slots long and a single HARQ codebook is scheduled to be transmitted. The above HARQ processing (e.g., using the slot offset (K1), SLIV, and PUCCH resource table) can be applied at the group level or at a slot level within the HARQ slot group to determine the specific symbols to use for the HARQ codebook transmission. This type of processing is further described in the next figures.

FIG. 14 illustrates an example of HARQ slot group-based processing in accordance with some embodiments. The upper part of FIG. 14 illustrates HARQ processing per release 15 of the 3GPP technical specification. The middle part of FIG. 14 illustrates an option for HARQ processing per release 16 of the 3GPP technical specification. The lower part of FIG. 14 illustrates the HARQ slot group-based processing.

Per release 15 of the 3GPP technical specification, a HARQ slot 1410 can be defined as a slot that includes fourteen symbols 1412. Per Table 11 above, some of the symbols are used to encode a HARQ codebook. The UE is not expected to transmit more than one HARQ codebook in the HARQ slot 1410.

Release 16 of the 3GPP technical specification allows the UE to transmit more than one HARQ codebook within a slot. In particular, release 16 allows the definition of two sub-slots within a slot (illustrated as sub-slot 1420A and sub-slot 1420B, each of which is seven symbols long, and the combination of which has the same length of fourteen symbols as the HARQ slot 1410). Given the two sub-slots, two HARQ codebooks with up to one sub-slot based HARQ codebook are allowed. In other words, two slot-based HARQ codebooks (two HARQ codebooks within the slot formed by the sub-slots 1420A and 1420B) can be simultaneously constructed for supporting HARQ codebooks with different priorities at the UE. Or, one slot-based HARQ codebook with one sub-slot based HARQ codebook (e.g., two HARQ codebooks, one within the slot formed by the sub-slots 1420A and 1420B sub-slot, and one within one of the two sub-slots 142AA or 1420B) can be simultaneously constructed for supporting HARQ codebooks with different priorities at the UE.

In comparison, the HARQ slot group-based processing relies on a HARQ slot group 1430. The HARQ slot group 1430 includes multiple slots (FIG. 14 illustrates the minimum size of two, showing that the HARQ slot group 1430 is formed by a slot 1432A and a slot 1432B). The number of slots that is included in the HARQ slot group 1430 can depend on the subcarrier spacing. Generally, the larger the subcarrier spacing is, the larger the number of slots becomes to help with mitigating the impact of the subcarrier spacing increase to the HARQ processing time. For instance, two, four, eight, and sixteen slots can form the HARQ slot group 1430 for subcarrier spacing 240 KHz, 480 KHz, 960 KHz, and 1920 KHz, respectively. Additionally or alternatively, a range of slots (e.g., minimum and maximum number of slots) can be used, where this range depends on the subcarrier spacing.

The HARQ slot group 1430 has a time length that depends on the number of slots included therein and the subcarrier spacing (e.g., the time length of the symbols). Relative to the HARQ slot 1410 (used for subcarrier spacing of 120 KHz or smaller), the time length can be the same, smaller, or longer. For instance, FIG. 11 illustrates subcarrier spacing of 120 KHz for release 15 and release 16 and subcarrier spacing of 240 KHz for the HARQ slot group approach. The symbols 1434 in the slots 1432a and 1432B have half the time lengths of the symbols 1412. However, the time length of the HARQ slot 1410 and the HARQ slot group 1430 is the same because the HARQ slot group 1430 includes twice the number of symbols 1434 than the HARQ slot 1410. Because the time lengths are the same, the impact of the subcarrier spacing increase to the HARQ processing time can be mitigated.

The HARQ slot group 1430 can support a set of HARQ codebooks. One HARQ codebook can be encoded within the HARQ slot group 1430. However, the size of the set can be more than one to support different priorities at a UE. Up to one HARQ codebook can be encoded within a slot of the HARQ slot group. Or, up two HARQ codebooks can be encoded given sub-slots of a slot of the HARQ slot group, similar to release 16. In addition, HARQ slot sub-groups can be defined within the HARQ slot group 1430. Each sub-group can include one or more slots, one or more sub-slots within a slot, or one or more sub-slots within a plurality of lots. In this case, a HARQ codebook within a HARQ slot sub-group can be used.

With the HARQ slot group-based approach, the scheduling of the HARQ feedback transmission (e.g., slot offset (K1) and/or number of OFDM symbols (N1)) can be at the HARQ slot group level rather than at a slot level (e.g., rather than indexing candidate slots, the slot offset (K1) indexes candidate slot groups; similarly, rather than indexing candidate symbols in each slot for the encoding, the OFDM symbols (N1) indexes the same symbol position across the different slots of the HARQ slot group). In addition, the UE may be configured to use a HARQ slot group having a particular size. Further, updates may be needed to the PUCCH resource configuration (e.g., PUCCH resource table) to identify the specific slot(s) and symbols within (slots) of a HARQ slot group for the use in the encoding of the set of HARQ codebooks. Updates to the codebook generation may also be needed. These and other aspects of the HARQ processing are described herein next.

The UE can be configured through RRC messages. For instance, the UE can signal its capability of supporting subcarrier spacing larger than 120 KHz to a base station. In turn, the base station can configure the UE with a HARQ slot group configuration that indicates, for example, the number of slots in a HARQ slot group. The slot group configuration can also indicate the number of HARQ codebooks that the HARQ slot group supports (e.g., one HARQ codebook to be encoded within the HARQ slot group, up to one HARQ codebook to be encoded within a slot of the HARQ slot group, up two HARQ codebooks to be encoded given sub-slots of a slot of the HARQ slot group, or a HARQ codebook to be encoded within a HARQ slot sub-group of the HARQ slot group). The HARQ slot configuration can be communicated in a "dl-DatatoUL-ACK-SLOT-Group" similar to the "dl-DatatoUL-ACK" in a PUCCH configuration. However, other options to configure the UE are possible. For instance, the HARQ slot group configuration can be dynamically changed overtime by being indicated in DCI. Additionally or alternatively, the HARQ slot group configuration can be set in a predefined configuration of the UE (e.g., defined in a 3GPP technical specification).

Next, the base station sends a DCI to the UE (e.g., DCI format 1_0, format 1_1, or format 1_2). The DCI schedules HARQ feedback transmission (per a slot offset K1) and indicates particular symbols in a HARQ slot group to encode the applicable set of HARQ codebooks. In one example, the DCI does not change relative to the existing structure. Instead, the PUCCH resource table (e.g., see Table 11 above) is changed (e.g., expanded) to include additional indexed rows or a new PUCCH resource table is defined. In both cases, the PUCCH resource table includes "first symbol" and "number of symbols" entries to accommodate the addition number of symbols in a HARQ slot group. In another example, the DCI's structure is changed, whereas the PUCCH resource table may stay the same (e.g., Table 11 is usable without modification). In this case, the DCI may include a field of one or more bits, where the bit values indicates a slot, sub-slot, and/or sub-group within the HARQ slot group. The PUCCH resource table is looked-up to determine the first symbol and the number of symbols applicable to the indicated slot, sub slot, and/or sub-group.

The UE receives the DCI and determines the number of HARQ codebooks to generate, the HARQ slot group to use, and the symbols within the HARQ slot group to encode the HARQ codebook(s). Thereafter, the UE processes the downlink data to generate and send the HARQ codebook(s) as HARQ feedback using the symbols.

Different options for generating a HARQ codebook are possible. In a first example, each transport block or each code block group (e.g., from the corresponding data reception for which the HARQ codebook is to be generated) is assigned a separate ACK/NAK. When multiple transport blocks or code block groups exist, multiple ACKs/NAKs are generated. These ACKs/NAKs are multiplexed into a single HARQ codebook. A separate HARQ codebook is created, as applicable, for each HARQ slot group, HARQ sub-group, HARQ slot, or HARQ sub-slot. As a result, a single HARQ codebook is generated for the multiple transport blocks or code block groups, thereby reducing the total number of HARQ codebooks relative to using a HARQ codebook per transport block or code block group. However, the HARQ codebook size may be relatively larger because multiple ACKs/NAKs are multiplexed.

In a second example, a single ACK/NAK is assigned for multiple transport blocks or code block groups, resulting in a single HARQ codebook. Here, the multiple ACKs/NAKs are generated and bundled together, resulting in the single ACK/NAK. The bundling can involve the use of an AND operations, where an ACK is represented by a "1" and an NAK is represented by a "0". For instance, if four ACKs and one NAK were generated, the bundling results in a NAK to be encoded in the HARQ codebook. Only when all five are ACKs does the bundling result in an ACK to be encoded in the HARQ codebook. This bundling can be performed across multiple sub-slots within a slot of a HARQ slot group, multiple slots of the HARQ group, or multiple HARQ sub-groups of the HARQ slot group and/or across multiple HARQ groups. Because a single HARQ codebook is used instead of multiple ones, the HARQ transmission overhead is reduced. However, the HARQ codebook may not be granular to a transport block level or a code block group level and may necessitate a larger transmission overhead upon a NAK.

As explained herein above, an increase to the subcarrier spacing results in an increase to the OFDM symbols (N1). In turn, an increase to the OFDM symbols (N1) may result in multiple symbols being transmitted before PDSCH is processed. For instance, with a 960 KHz subcarrier spacing, up to one-hundred sixty symbols or eleven slots may be transmitted before processing. Additional embodiments can be used to help mitigating the impact of the subcarrier spacing increase to the HARQ processing, where these embodiments relate to the underlying HARQ processes. These embodiments can be used in conjunction with or independent of the above HARQ scheduling and HARQ slot group embodiments.

In some embodiments, the maximum number of HARQ processes is increased. For instance, in release 15 and release 16 of the 3GPP technical specification, the maximum number is set to sixteen. Due to the increase to the number of received symbols, the maximum number can be increased to be more than sixteen based on the subcarrier spacing being larger than 120 KHz. The additional HARQ processes can be synchronous or asynchronous. To keep track of each HARQ process, the UE and base station need to know the HARQ process number for each HARQ transmission/HARQ reception. To do so, DCI includes a "HARQ Processor number" field. This field is four bits long and can accommodate the increase to the maximum number of HARQ processes (e.g., to be more than sixteen).

In some embodiments, the maximum number of HARQ processes is not increased. Instead, the repetition number to prevent the need for HARQ delay, the target BLER for link adaptation, and/or single transmission (no HARQ) or ARQ only for a subset of the HAR processes can be allowed.

For instance, on the downlink, a repetition number is defined in a DL_REPETITION_NUMBER that provides the number of transmissions to the UE repeated in a bundle. On the uplink, a repetition number is defined in a UL_REPETITION_NUMBER that provides the number of transmission repetitions from the UE within a bundle. In both cases, the repetition number can be increased based on the subcarrier spacing. For instance, the repetition number can be an implicit multiplier of the subcarrier spacing. By increasing the repetition number, a smaller number of HARQ processes may be needed. The repetition number can be indicated via DCI.

BLER refers to the block error code that depends on the number of transport blocks or code block groups and the NAKs generated for them. The BLER can be changed (e.g., from ten percent to fifteen percent or any other value). Given the change, a different modulation coding scheme (MCS) can be used (e.g., from a QAM modulation to a QPSK modulation), where the modulation is adapted to meet the target BLER. Each target BLER can be associated with one or more MCSs in an MCS table. The target BLER and the associated MCS(s) can be based on the subcarrier spacing. For instance, the target BLER can be increased with an increase to the subcarrier spacing to allow a higher BLER and lower retransmissions given the increase to the number of OFDM symbols (N1). The BLER and/or MCS table can be defined in an RRC configuration of the UE.

Further, a transmission of data to the UE on the downlink may be allowed without HARQ transmission back from the UE. This approach represents an exception to the HARQ processes, where HARQ feedback may not be generated for some of the downlink slots or symbols therein. Additionally or alternatively, ARQ only (rather than HARQ) may be used for a subset of the HARQ processes. The no HARQ transmission or the ARQ only transmission can be defined in an RRC configuration, media access control (MAC) control element (CE), or DCI.

Other embodiments can be additionally or alternatively used to help mitigating the impact of the subcarrier spacing increase to the HARQ processing, where these embodiments relate to the HARQ codebook design. In some embodiments, the Type 1 (semi-static) codebook is used. The time window covered by this type of HARQ codebook can be increased by increasing the maximum number of slots that the HARQ codebook covers. This approach may increase overhead. The overhead can be reduced by using a HARQ slot group or a HARQ slot sub-group, as described herein above. Yet another approach to reduce overhead is to generate and send HAQ feedback for only slots that have valid symbols. A validity of a symbol can be defined in different ways. For instance, when a valid base station-UE beam pair exists, the resulting symbols are valid. In another illustration, HARQ feedback is sent on the uplink. Thus, downlink-only slots cannot be used to transmit the HARQ feedback, whereas uplink-only slots and flexible slots can be used. In this case, downlink only slots are removed from the HARQ processing, such as from being candidate slots for the transmission of the HARQ feedback. In some embodiments, the Type 2 (dynamic) codebook is used. The time window covered by this type of HARQ codebook can be increased by increasing the maximum dynamic assignment (e.g., one or both of cDIA and tDAI). This maximum can be increased from two, and the increase can depend on the subcarrier spacing (e.g., the larger the subcarrier spacing, the larger the increase becomes).

FIG. 15 illustrates an example of an operational flow/algorithmic structure 1500 for HARQ slot group-based processing in accordance with some embodiments. A UE can implement the operational flow/algorithmic structure 1500 to generate and transmit HARQ feedback on a physical channel that has a frequency larger than 52.6 GHz, where the HARQ transmission and/or the reception of data for which the HARQ feedback is generates use a subcarrier spacing larger than 120 KHz. The operation flow/algorithmic structure 1500 may be performed or implemented by the UE such as, for example, the UE 104, 1700, or components thereof, for example, processors 1704.

The operation flow/algorithmic structure 1500 may include, at 1502, receiving, from a base station, receiving downlink control information (DCI) from a base station. In some embodiments, the DCI has format 1_0, format 1_1, or format 1_2. The DCI includes a slot offset indicator that indicates the base-station signaled slot offset. The slot offset indicator can be, for instance, the "time domain resource assignment." In some embodiments, the DCI also includes a slot indicator usable to identify a slot, a sub-slot, or a sub-group within a HARQ slot group.

The operation flow/algorithmic structure 1500 max include, at 1504, determining, based on the DCI, a physical uplink channel resource within a slot of a hybrid automatic repeat request (HARQ) slot group, the HARQ slot group including a plurality of slots available to transmit one or more HARQ codebooks on a physical uplink channel, the physical uplink channel having a frequency larger than 52.6 GHz, transmission on the physical uplink channel using a subcarrier spacing larger than 150 KHz. In some embodiments, the physical channel resource includes a set of symbols within the HARQ slot group, where these symbols are used to encode a set of HARQ codebooks. The "time domain resource assignment" can be used to determine, from a PUCCH resource table and based on a SLIV, the first symbol and the number of symbols from the HARQ slot group, a sub-group of the HARQ slot group, a slot within the HARQ slot group, or sub-slots within the slot or across multiple slots of the HARQ slot group. In some embodiments, the slot indicator in the DCI is used to identify the particular slot, sub-slot, or sub-group within the HARQ slot group and the PUCCH resource table may be used to merely identify the first symbol and the number of symbols. Data (e.g., transport block(s) or code block group(s)) that is received and for which HARQ feedback is scheduled is processed. The UE can use type 1 or Type 2 codebooks, along with a bundling approach or a multiplexing approach to encode the ACKs/NAKs corresponding to the data.

The operation flow/algorithmic structure 1500 may include, at 1506, transmitting, on the physical uplink channel, the one or more HARQ codebooks in the physical uplink channel resource. In some embodiments, the determined symbols within the HARQ slot groups encode the set of HARQ codebooks (e.g., using an OFDM multiplexing).

In some embodiments, the operation flow/algorithmic structure 1500 may include additional sets of operations that may be used in conjunction with the above operations. These additional sets may be used independently of each other or in conjunction with each other. When used in conjunction, the additional sets can be performed sequentially or in parallel. Although FIG. 15 illustrates that the additional sets are a part of the operation flow/algorithmic structure 1500, each of these sets can be performed in an independent operation flow/algorithmic structure.

In an example of the additional sets, the operation flow/algorithmic structure 1500 may include, at 1510, generating the one or more HARQ codebooks based on a number of HARQ processes. In some embodiments, based on the subcarrier spacing being larger than 120 KHz, the number of HARQ processes is increased to be more than sixteen to allow the processing of additional PDSCH symbols, resulting in additional ACKs/NAKs that can be fed back in the one or more HARQ codebooks.

In an example of the additional sets, the operation flow/algorithmic structure 1500 may include, at 1520, determining a repetition number based on the DCI. In some embodiments, the repetition number is increased with an increase to the subcarrier spacing, resulting in a smaller amount of HARQ information that is to be fed back. The operation flow/algorithmic structure 1500 may also include, at 1522, generating the one or more HARQ codebooks based on the repetition number. In some embodiments, the increase to the repetition results in a decrease to the amount of HARQ information that are coded in the one or more HARQ codebooks.

In an example of the additional sets, the operation flow/algorithmic structure 1500 may include, at 1530, determining a block error rate (BLER) for link adaptation based on a radio resource control (RRC) configuration of the UE, the BLER associated with a modulation coding scheme (MCS) table that is defined based on the subcarrier spacing being larger than 120 KHz. In some embodiments, the larger the subcarrier spacing, the larger the target BLER can be made to reduce the needed number of re-transmission and the overall HARQ processing. The operation flow/algorithmic structure 1500 may also include, at 1532, decoding a set of transport blocks or a set of code block groups based on the BLER. In some embodiments, error correction code (ECC) algorithm is applied to decode the of transport blocks or a set of code block groups and derive the actual BLER. Further, the operation flow/algorithmic structure 1500 may include, at 1534, generating the one or more HARQ codebooks based on the decoding. In some embodiments, if the actual BLER is better (e.g., smaller) than the target BLER, the amount of HARQ information that need to be fed back is reduced resulting in a decrease to the amount of HARQ information that are coded in the one or more HARQ codebooks.

Although embodiments are described in connection with HARQ processing, the slot offset (K1), and the number of OFDM symbols (N1) in FIGS. 13-15, these embodiments are not limited as such. Instead the embodiments similarly apply to downlink data processing and the slot offset (K0) The embodiments also similarly apply to uplink data processing, the slot offset (K2), and the number of OFDM symbols (N2). For instance, a super slot can be defined for downlink data or uplink data. A super slot is a data slot group that includes multiple slots. Rather than indexing each slot in the super slot, the slot offset (K0 or K2) can index the super slot. In other words, in the embodiments of FIGS. 13-15, a HARQ slot group can be replaced with a super slot and the HARQ processing can be replaced with the applicable downlink or uplink data processing. Furthermore, although some embodiments described in connection with FIGS. 13-15 involve DCI format 1_0, format 1_1, or format 1_2, these formats are provided for illustrative purposes and the embodiments can similarly apply to other DCI formats including, DC format 1_x.

Figure 16:
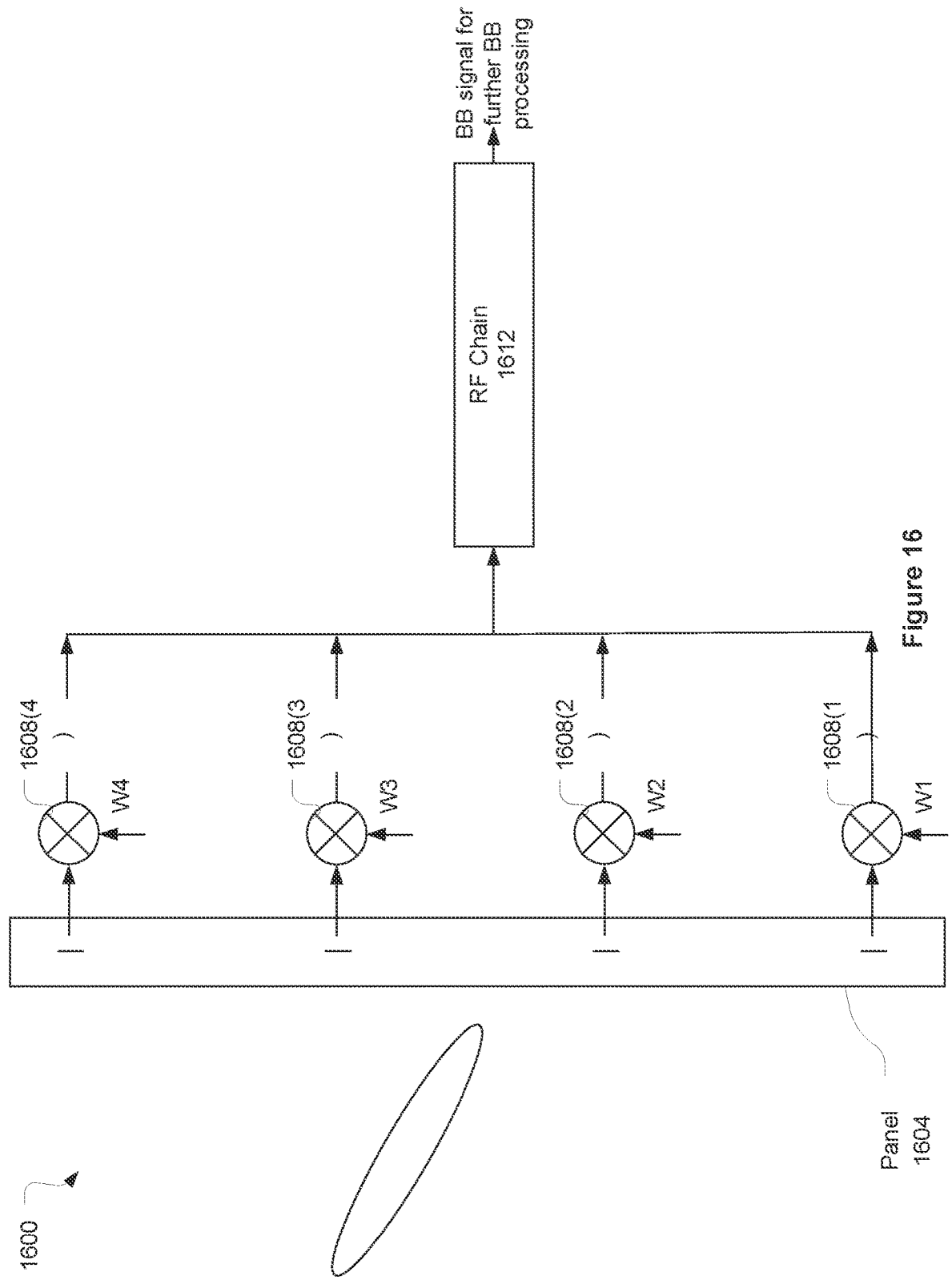
FIG. 16 illustrates an example of receive components in accordance with some embodiments.

FIG. 16 illustrates receive components 1600 of the UE 104 in accordance with some embodiments. The receive components 1600 may include an antenna panel 1604 that includes a number of antenna elements. The panel 1604 is shown with four antenna elements, but other embodiments may include other numbers.

The antenna panel 1604 may be coupled to analog beamforming (BF) components that include a number of phase shifters 1608(1)-1608(4). The phase shifters 1608(1)-1608(4) may be coupled with a radio-frequency (RF) chain 1612. The RF chain 1612 may amplify a receive analog RF signal, downconvert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values, to the phase shifters 1608(1)-1608(4) to provide a receive beam at the antenna panel 1604. These BF weights may be determined based on the channel-based beamforming.

Figure 17:
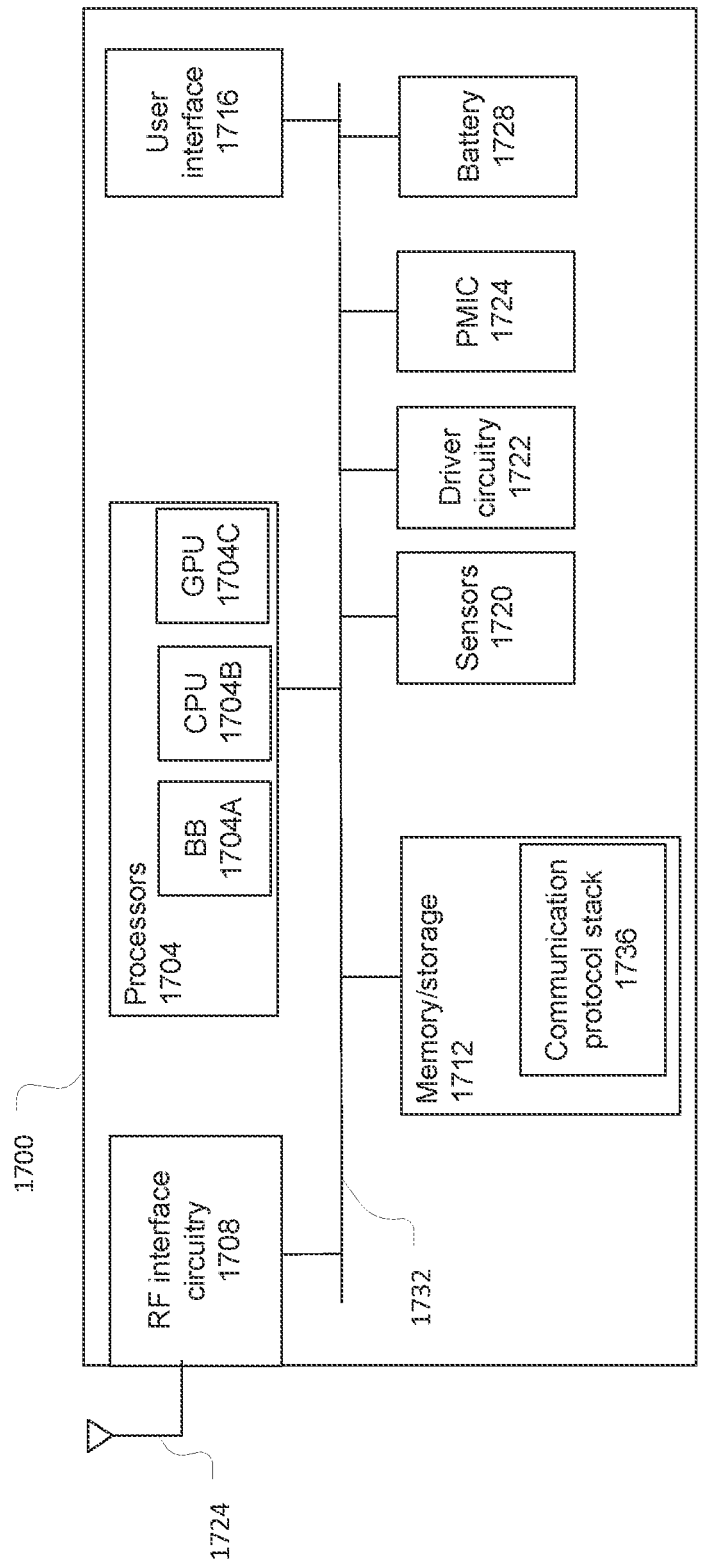
FIG. 17 illustrates an example of a UE in accordance with some embodiments.

FIG. 17 illustrates a UE 1700 in accordance with some embodiments. The UE 1700 may be similar to and substantially interchangeable with UE 174 of FIG. 1.

Similar to that described above with respect to UE 174, the UE 1700 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.) video surveillance/monitoring devices (for example, cameras, video cameras, etc.) wearable devices; relaxed-IoT devices. In some embodiments, the UE may be a reduced capacity UE or NR-Light UE.

The UE 1700 may include processors 1704, RF interface circuitry 1708, memory/storage 1712, user interface 1716, sensors 1720, driver circuitry 1722, power management integrated circuit (PMIC) 1724, and battery 1728. The components of the UE 1700 may be implemented as integrated circuits (ICs), portions thereof, discrete electronic devices, or other modules, logic, hardware, software, firmware, or a combination thereof. The block diagram of FIG. 17 is intended to show a high-level view of some of the components of the UE 1700. However, some of the components shown may be omitted, additional components may be present, and different arrangement of the components shown may occur in other implementations.

The components of the UE 1700 may be coupled with various other components over one or more interconnects 1732, which may represent any type of interface, input/output, bus (local, system, or expansion), transmission line, trace, optical connection, etc. that allows various circuit components (on common or different chips or chipsets) to interact with one another.

The processors 1704 may include processor circuitry such as, for example, baseband processor circuitry (BB) 1704A, central processor unit circuitry (CPU) 1704B, and graphics processor unit circuitry (GPU) 1704C. The processors 1704 may include any type of circuitry or processor circuitry that executes or otherwise operates computer-executable instructions, such as program code, software modules, or functional processes from memory/storage 1712 to cause the UE 1700 to perform operations as described herein.

In some embodiments, the baseband processor circuitry 1704A may access a communication protocol stack 1736 in the memory/storage 1712 to communicate over a 3GPP compatible network. In general, the baseband processor circuitry 1704A may access the communication protocol stack to: perform user plane functions at a PHY layer, MAC layer, RLC layer, PDCP layer, SDAP layer, and PDU layer, and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1708.

The baseband processor circuitry 1704A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The baseband processor circuitry 1704A may also access group information 1724 from memory/storage 1712 to determine search space groups in which a number of repetitions of a PDCCH may be transmitted.

The memory/storage 1712 may include any type of volatile or non-volatile memory that may be distributed throughout the UE 1700. In some embodiments, some of the memory/storage 1712 may be located on the processors 1704 themselves (for example, L1 and L2 cache), while other memory/storage 1712 is external to the processors 1704 but accessible thereto via a memory interface. The memory/storage 1712 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1708 may include transceiver circuitry and radio frequency front module (RFEM) that allows the UE 1700 to communicate with other devices over a radio access network. The RF interface circuitry 1708 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1724 and proceed to filter and amplify (with a low-noise amplifier) the signal. The signal may be provided to a receiver of the transceiver that down-converts the RF signal into a baseband signal that is provided to the baseband processor of the processors 1704.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1724.

In various embodiments, the RF interface circuitry 1708 may be configured to transmit/receive signals in a manner compatible with NR access technologies.

The antenna 1724 may include a number of antenna elements that each convert electrical signals into radio waves to travel through the air and to convert received radio waves into electrical signals. The antenna elements may be arranged into one or more antenna panels. The antenna 1724 may have antenna panels that are omnidirectional, directional, or a combination thereof to enable beamforming and multiple input, multiple output communications. The antenna 1724 may include microstrip antennas, printed antennas fabricated on the surface of one or more printed circuit boards, patch antennas, phased array antennas, etc. The antenna 1724 may have one or more panels designed for specific frequency bands including bands in FR1 or FR2.

The user interface circuitry 1716 includes various input/output (I/O) devices designed to enable user interaction with the UE 1700. The user interface 1716 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1700.

The sensors 1720 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like), depth sensors, ambient light sensors, ultrasonic transceivers; microphones or other like audio capture devices; etc.

The driver circuitry 1722 may include software and hardware elements that operate to control particular devices that are embedded in the UE 1700, attached to the UE 1700, or otherwise communicatively coupled with the UE 1700. The driver circuitry 1722 may include individual drivers allowing other components to interact with or control various input/output (I/O) devices that may be present within, or connected to, the UE 1700. For example, driver circuitry 1722 may include a display driver to control and allow access to a display device, a touchscreen driver to control and allow access to a touchscreen interface, sensor drivers to obtain sensor readings of sensor circuitry 1720 and control and allow access to sensor circuitry 1720, drivers to obtain actuator positions of electro-mechanic components or control and allow access to the electro-mechanic components, a camera driver to control and allow access to an embedded image capture device, audio drivers to control and allow access to one or more audio devices.

The PMIC 1724 may manage power provided to various components of the UE 1700. In particular, with respect to the processors 1704, the PMIC 1724 may control power-source selection, voltage scaling, battery charging, or DC-to-DC conversion.

In some embodiments, the PMIC 1724 may control, or otherwise be part of, various power saving mechanisms of the UE 1700. For example, if the platform UE is in an RRC Connected state, where it is still connected to the RAN node as it expects to receive traffic shortly, then it may enter a state known as Discontinuous Reception Mode (DRX) after a period of inactivity. During this state, the UE 1700 may power down for brief intervals of time and thus save power. If there is no data traffic activity for an extended period of time, then the UE 1700 may transition off to an RRC_Idle state, where it disconnects from the network and does not perform operations such as channel quality feedback, handover, etc. The UE 1700 goes into a very low power state and it performs paging where again it periodically wakes up to listen to the network and then powers down again. The UE 1700 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1728 may power the UE 1700, although in some examples the UE 1700 may be mounted deployed in a fixed location, and may have a power supply coupled to an electrical grid. The battery 1728 may be a lithium ion battery, a metal-air battery, such as a zinc-air battery, an aluminum-air battery, a lithium-air battery, and the like. In some implementations, such as in vehicle-based applications, the battery 1728 may be a typical lead-acid automotive battery.

Figure 18:
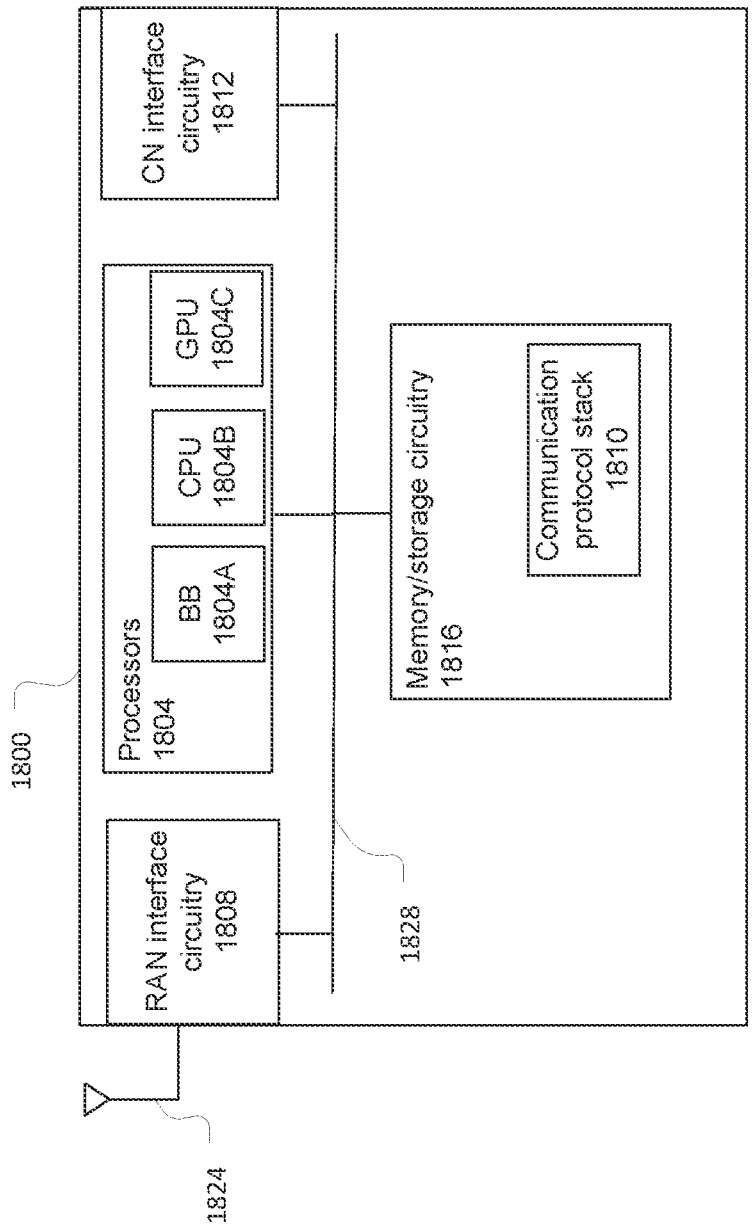
FIG. 18 illustrates an example of a base station in accordance with some embodiments.

FIG. 18 illustrates a gNB 1800 in accordance with some embodiments. The gNB node 1800 may similar to and substantially interchangeable with gNB 108. A base station, such as the base station 182, can have the same or similar components as the gNB 1800.

The gNB 1800 may include processors 1804, RF interface circuitry 1808, core network (CN) interface circuitry 1812, and memory/storage circuitry 1816.

The components of the gNB 1800 may be coupled with various other components over one or more interconnects 1828.

The processors 1804, RF interface circuitry 1808, memory/storage circuitry 1816 (including communication protocol stack 1810), antenna 1824, and interconnects 1828 may be similar to like-named elements shown and described with respect to FIG. 10.

The CN interface circuitry 1812 may provide connectivity to a core network, fix example, a 5$^{th}$ Generation Core network (5GC) using a 5GC-compatible network interface protocol such as carrier Ethernet protocols, or some other suitable protocol. Network connectivity may be provided to/from the gNB 1800 via a fiber optic or wireless backhaul. The CN interface circuitry 1812 may include one or more dedicated processors or FFGAs to communicate using one or more of the aforementioned protocols. In some implementations, the CN interface circuitry 1812 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method. The method is implemented by a user equipment (UE) and comprises: receiving, from a base station, downlink control information (DCI) indicating a base station-signaled slot offset; determining a minimum slot offset that is based on a subcarrier spacing of a physical downlink channel being larger than 120 KHz; determining, based on the minimum slot offset and the base station-signaled slot offset, a slot offset (K1) between data reception on the physical downlink channel and hybrid automatic repeat request (HARQ) transmission on a physical uplink channel; and transmitting, on the physical uplink channel and based on the slot offset (K1), HARQ feedback for the data reception.

Example 2 includes a method of example 1, wherein the physical downlink channel having a frequency larger than 52.6 gigaHertz (GHz), and wherein the DCI has at least one of: format 1_0, format 1_1, format 1_2, or format 1_x.

Example 3 includes a method of any of the preceding examples, wherein the minimum slot offset is determined from at least one of: a radio resource control (RRC) configuration of the UE, the DCI, or a predefined configuration of the UE.

Example 4 includes the method of any of the preceding examples, wherein the minimum slot offset is determined as a round-up or round-down integer equal to a ratio of (i) a number of OFDM symbols (N1) required for UE processing from an end of the data reception to the earliest possible start of the HARQ transmission to (ii) a number of symbols in a slot.

Example 5 includes the method of any of the preceding examples, wherein determining the slot offset (K1) comprises: selecting the slot offset (K1) from a plurality of non-consecutive candidate slots based on the minimum slot offset and the base station-signaled slot offset.

Example 6 includes the method of any of example 5, further comprising: determining a slot offset multiplier from at least one of: a radio resource control (RRC) configuration of the UE, the DCI, or a predefined configuration of the UE; and selecting the slot offset (K1) from the plurality of non-consecutive candidate slots based further on the slot offset multiplier.

Example 7 includes the method of any of example 6, further comprising: selecting the slot offset (K1) based on a sum of (i) the minimum slot offset and (ii) a multiplication of the base station-signaled slot offset by the slot offset multiplier.

Example 8 includes the method of any of example 5, further comprising: generating a slot position hash by at least hashing the base station-signaled slot offset; and selecting the slot offset (K1) based on the slot position hash.

Example 9 includes the method of example 8, further comprising: selecting the slot offset (K1) based on a sum of (i) the minimum slot offset and (ii) the slot position hash.

Example 10 includes the method of any of the preceding examples, further comprising: determining a second slot offset (K0) that is based on the subcarrier spacing being larger than 120 KHz, the second slot offset (K0) being between DCI reception and the data reception, wherein transmitting the HARQ feedback is further based on the second slot offset.

Example 11 includes a method. The method is implemented by a user equipment (UE) and comprises: signaling, to a base station, capability of the UE for data reception on a physical downlink channel, the data reception to use a subcarrier spacing larger than 120 KHz; receiving, from the base station, downlink control information (DCI) that includes a slot offset indicator; determining, based on the slot offset indicator, a slot offset (K1) between the data reception and hybrid automatic repeat request (HARQ) transmission on a physical uplink channel, the slot offset (K1) being larger than a minimum number of slots that is based on the subcarrier spacing being larger than 120 KHz; and transmitting, on the uplink physical channel and based on the slot offset (K1), HARQ feedback for the data reception.

Example 12 includes the method of any of the preceding examples, wherein the physical downlink channel has a frequency larger than 52.6 GHz, and wherein the minimum number is eight slots, wherein the DCI has format 1_0 and includes a physical downlink shared channel (PDSCH)-to-HARQ feedback timing indicator field that has a bit size, wherein the bit size is at least four bits based on the subcarrier spacing being larger than 120 KHz.

Example 13 includes the method of any of the preceding examples, wherein the minimum number is fifteen slots, wherein the DCI has format 1_1 or 1_2 and includes a physical downlink shared channel (PDSCH)-to-HARQ feedback timing indicator field that has a bit size, wherein the bit size is at least five bits based on the subcarrier spacing being larger than 120 KHz.

Example 14 includes the method of any of the preceding examples, wherein the DCI has format 1_1 or 1_2, wherein the slot offset (K1) has a value larger than fifteen slots, wherein the value is defined in a resource control (RRC) configuration field.

Example 15 includes the method of any of the preceding examples, further comprising: determining a second slot offset (K0) that is based on the subcarrier spacing being larger than 120 KHz, the second slot offset (K0) being between DCI reception and the data reception, wherein transmitting the HARQ feedback is further based on the second slot offset.

Example 16 includes a method. The method is implemented by a UE and comprises receiving, from a base station, downlink control information (DCI) indicating a base station-signaled slot offset between DCI reception and data communication on a physical channel, the data communication being downlink data reception or uplink data transmission, the data communication using a subcarrier spacing larger than 120 KHz; determining a minimum slot offset that is based on the subcarrier spacing being larger than 120 KHz; determining a slot offset based on the minimum slot offset and the base station-signaled slot offset; and performing one of: receiving, on the physical channel and based on the slot offset, downlink data if the data communication is the downlink data reception, or transmitting, on the physical channel and based on the slot offset, uplink data if the data communication is the uplink data transmission.

Example 17 includes the method of any of the preceding examples, wherein, the physical channel has a frequency larger than 52.6 GHz, and wherein the minimum slot offset is determined as a round-up or round-down integer equal to a ratio of (i) a number of OFDM symbols (N2) required for UE processing from an end of the DCI reception to the earliest possible start of the uplink data transmission to (ii) a number of symbols in a slot.

Example 18 includes the method of any of the preceding examples, wherein the slot offset indicates non-consecutive slots between the DCI reception and the data communication.

Example 19 includes the method of example 18, further comprising: determining a slot offset multiplier from at least one of: a radio resource control (RRC) configuration of the UE, the DCI, or a start and length indicator (SLIV) process, wherein the non-consecutive slots are indicated based on the slot offset multiplier, and wherein the slot offset is determined based on a sum of (i) the minimum slot offset and (ii) a multiplication of the base station-signaled slot offset by the slot offset multiplier.

Example 20 includes the method of any of the preceding examples, wherein the minimum slot offset is determined from a radio resource control (RRC) configuration of the UE, the DCI, or a radio resource control (RRC) configuration of the UE, the DCI, or a predefined configuration of the UE.

Example 21 includes a UE comprising means to perform one or more elements of a method described in or related to any of the examples 1-20.

Example 22 includes one or more non-transitory computer-readable media comprising instructions to cause a UE, upon execution of the instructions by one or more processors of the UE, to perform one or more elements of a method described in or related to any of the examples 1-20.

Example 23 includes a UE comprising logic, modules, or circuitry to perform one or more elements of a method described in or related to any of the examples 1-20.

Example 24 includes a UE comprising: one or more processors and one or more computer-readable media comprising instructions that, when executed by the one or more processors, cause the one or more processors to perform one or more elements of a method described in or related to any of the examples 1-20.

Example 25 includes a system comprising means to perform one or more elements of a method described in or related to any of the examples 1-20.

Example 26 includes one or more non-transitory computer-readable media comprising instructions to cause a system, upon execution of the instructions by one or more processors of the system, to perform one or more elements of a method described in or related to any of the examples 1-20.

Example 27 includes a system comprising: one or more processors and one or more computer-readable media comprising instructions that, when executed by the one or more processors, cause the one or more processors to perform one or more elements of a method described in or related to any of the examples 1-20.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
    processing downlink control information (DCI) indicating a base station-signaled slot offset;
    determining a minimum slot offset that is based on a subcarrier spacing of a physical downlink channel being larger than 120 KHz;
    determining, based on the minimum slot offset and the base station-signaled slot offset, a slot offset (K1) between data reception on the physical downlink channel and hybrid automatic repeat request (HARQ) transmission on a physical uplink channel; and
    causing transmission, on the physical uplink channel and based on the slot offset (K1), of HARQ feedback for the data reception.

2. The method of claim 1, wherein the physical downlink channel having has a frequency larger than 52.6 gigaHertz (GHz), and wherein the DCI has at least one of: format 1_0, format 1_1, format 1_2, or format 1_x.

3. The method of claim 1, wherein the minimum slot offset is determined from at least one of: a radio resource control (RRC) configuration of a user equipment (UE), the DCI, or a predefined configuration of the UE.

4. The method of claim 1, wherein the minimum slot offset is determined as a round-up or round-down integer equal to a ratio of (i) a number of OFDM symbols (N1) required for UE processing from an end of the data reception to the earliest possible start of the HARQ transmission to (ii) a number of symbols in a slot.

5. The method of claim 1, wherein determining the slot offset (K1) comprises:
    selecting the slot offset (K1) from a plurality of non-consecutive candidate slots based on the minimum slot offset and the base station-signaled slot offset.

6. The method of claim 5, further comprising:
    determining a slot offset multiplier from at least one of: a radio resource control (RRC) configuration, the DCI, or a predefined configuration; and
    selecting the slot offset (K1) from the plurality of non-consecutive candidate slots based further on the slot offset multiplier.

7. The method of claim 6, further comprising: selecting the slot offset (K1) based on a sum of (i) the minimum slot offset and (ii) a multiplication of the base station-signaled slot offset by the slot offset multiplier.

8. The method of claim 5, further comprising:
    generating a slot position hash by at least hashing the base station-signaled slot offset; and
    selecting the slot offset (K1) based on the slot position hash.

9. The method of claim 8, further comprising: selecting the slot offset (K1) based on a sum of (i) the minimum slot offset and (ii) the slot position hash.

10. The method of claim 1, further comprising:
    determining a second slot offset (K0) that is based on the subcarrier spacing being larger than 120 KHz, the second slot offset (K0) being between DCI reception and the data reception, wherein transmitting the HARQ feedback is further based on the second slot offset.

11. The method of claim 1, wherein the minimum slot offset indicates a number of slots that is based on a number of OFDM symbols (N1) required for UE processing from an end of the data reception to the earliest possible start of the HARQ transmission.

12. The method of claim 1, wherein the base station-signaled offset indicates a candidate set of slots starting after the minimum slot offset.

13. An apparatus comprising:
processing circuitry configured to:
cause signaling, to a base station, of capability for data reception on a physical downlink channel, the data reception to use a subcarrier spacing larger than 120 KHz;
process downlink control information (DCI) that includes a slot offset indicator;
determine, based on the slot offset indicator, a slot offset (K1) between the data reception and hybrid automatic repeat request (HARQ) transmission on a physical uplink channel, the slot offset (K1) being larger than a minimum number of slots that is based on the subcarrier spacing being larger than 120 KHz; and
cause transmission, on the physical uplink channel and based on the slot offset (K1), of HARQ feedback for the data reception.

14. The apparatus of claim 13, wherein the physical downlink channel has a frequency larger than 52.6 GHz, and wherein the minimum number is eight slots, wherein the DCI has format 1_0 and includes a physical downlink shared channel (PDSCH)-to-HARQ_feedback timing indicator field that has a bit size, wherein the bit size is at least four bits based on the subcarrier spacing being larger than 120 KHz.

15. The apparatus of claim 13, wherein the minimum number is fifteen slots, wherein the DCI has format 1_1 or 1_2 and includes a physical downlink shared channel (PDSCH)-to-HARQ_feedback timing indicator field that has a bit size, wherein the bit size is at least five bits based on the subcarrier spacing being larger than 120 KHz.

16. The apparatus of claim 13, wherein the DCI has format 1_1 or 1_2, wherein the slot offset (K1) has a value larger than fifteen slots, wherein the value is defined in a resource control (RRC) configuration field.

17. The apparatus of claim 13, wherein the processing circuitry is further configured to:
determine a second slot offset (K0) that is based on the subcarrier spacing being larger than 120 KHz, the second slot offset (K0) being between DCI reception and the data reception, wherein transmitting the HARQ feedback is further based on the second slot offset.

18. One or more non-transitory computer-readable storage media storing instructions, that upon execution by one or more processors, cause operations comprising:
processing downlink control information (DCI) indicating a base station-signaled slot offset between DCI reception and data communication on a physical channel, the data communication being downlink data reception or uplink data transmission, the data communication using a subcarrier spacing larger than 120 KHz;
determining a minimum slot offset that is based on the subcarrier spacing being larger than 120 KHz;
determining a slot offset based on the minimum slot offset and the base station-signaled slot offset; and
causing one of:
reception, on the physical channel and based on the slot offset, of downlink data if the data communication is the downlink data reception, or
transmission on the physical channel and based on the slot offset, of uplink data if the data communication is the uplink data transmission.

19. The one or more non-transitory computer-readable storage media of claim 18, wherein the physical channel has a frequency larger than 52.6 GHz, and wherein the minimum slot offset is determined as a round-up or round-down integer equal to a ratio of (i) a number of OFDM symbols (N2) required for UE processing from an end of the DCI reception to the earliest possible start of the uplink data transmission to (ii) a number of symbols in a slot.

20. The one or more non-transitory computer-readable storage media of claim 18, wherein the slot offset indicates non-consecutive slots between the DCI reception and the data communication, wherein the operations further comprise:
determining a slot offset multiplier from at least one of: a radio resource control (RRC) configuration, the DCI, or a start and length indicator (SLIV) process, wherein the non-consecutive slots are indicated based on the slot offset multiplier, and wherein the slot offset is determined based on a sum of (i) the minimum slot offset and (ii) a multiplication of the base station-signaled slot offset by the slot offset multiplier.

* * * * *